(12) United States Patent  
Bruce et al.

(10) Patent No.: US 8,431,108 B2  
(45) Date of Patent: Apr. 30, 2013

(54) CATHODE MATERIALS AND METHODS FOR PRODUCTION

(75) Inventors: Peter G. Bruce, Scotland (GB); Shaju M. Kuthanapillil, Kerala (IN)

(73) Assignee: The University Court of the University of St. Andrews (GB)

(*) Notice: Subject to any disclaimer, the term of this patent is extended or adjusted under 35 U.S.C. 154(b) by 246 days.

(21) Appl. No.: 12/857,431

(22) Filed: Aug. 16, 2010

(65) Prior Publication Data

US 2011/0037018 A1    Feb. 17, 2011

Related U.S. Application Data

(60) Provisional application No. 61/234,106, filed on Aug. 14, 2009.

(51) Int. Cl.  
*C01D 1/02* (2006.01)

(52) U.S. Cl.  
USPC ........................... 423/594.4; 423/599

(58) Field of Classification Search ............... 423/594.4, 423/599  
See application file for complete search history.

(56) References Cited

PUBLICATIONS

Arrebola, J.C., et al. "PMMA-assisted synthesis of Li1-xNi0.5Mn1.5O4-d for high-voltage lithium batteries with expanded rate capability at high cycling temperatures." J Power Sources 180 (2008) 852-858.*

Shaju, K. M. and Bruce, Peter, G.; "Macroporous Li(Ni1/3Co1/3Mn1/3)O2: A High-Power and High-Energy Cathode for Rechrageable Lithium Batteries". Adv. Mater. 2006, 18, 2330-2334.*

K. Ariyoshi, R. Yamato, Y. Makimura, T. Amazutsumi, Y. Maeda and T. Ohzuku, *Electrochemistry*, 2008, 76, 46.  
Padhi, A. K.; Nanjundaswamy, K. S.; Goodenough, J. B. *J. Electrochem. Soc.* 1997, 144, 1188.  
Thackeray, M. M.; Johnson, P. J.; Depicciotto, L. A.; Bruce, P. G.; Goodenough, J. B. *Mater. Res. Bull.* 1984, 19, 179.  
Thackeray, M. M. *Prog. Solid State Chem.* 1997, 25,1.  
Tarascon, J. M.; Guyomard, D. *J. Electrochem. Soc.* 1991, 138, 2864.  
Pasquier, A. D.; Blyr, A.; Courjal, P.; Larcher, D.; Amatucci, G.; Gerand, B.; Tarascon, J. M. *J. Electrochem. Soc.* 1999, 146, 428.  
Amatucci, G.; Tarascon, J. M. *J. Electrochem. Soc.* 2002, 149, K31.  
Huang, H.; Vincent, C. A.; Bruce, P. G. *J. Electrochem. Soc.* 1999, 146, 3649.  
Shin, Y.; Manthiram, A. *J. Electrochem. Soc.* 2004, 151, A204.  
Cho, J.; Thackeray, M. M. *J. Electrochem. Soc.* 1999, 146, 3577.  
Xia, Y.; Sakai, T.; Fujieda, T.; Yang, X. Q.; Sun, X.; Ma, Z. F.; McBreen, J.; Yoshio, M. *J. Electrochem. Soc.* 2001, 148, A723.  
Takada, T.; Hayakawa, H.; Enoki, H.; Akiba, E.; Slegr, H.; Davidson, I.; Murray, J. *J. Power Sources* 1999, 81-82, 505.  
Thackeray, M. M.; Yang, S. H.; Kahaian, A. J.; Kepler, K. D.; Skinner, E.; Vaughey, J. T.; Hackney, S. A. *Electrochem. Solid-State Lett.* 1998, 1, 7.  
Xia, Y.; Zhou, Y.; Yoshio, M. *J. Electrochem. Soc.* 1997, 144, 2593.  
Amatucci, G. G.; Pereira, N.; Zheng, T.; Tarascon, J. M. *J. Electrochem. Soc.* 2001, 148, A171.  
Larcher, D.; Gerand, B.; Tarascon, J. M. *J. Solid State Electrochem.* 1998, 2, 137.  
Shin, Y.; Manthiram, A. *Chem. Mater.* 2003, 15, 2954.

(Continued)

*Primary Examiner* — Stuart Hendrickson  
*Assistant Examiner* — Richard M Rump  
(74) *Attorney, Agent, or Firm* — Knobbe, Martens, Olson & Bear, LLP

(57) ABSTRACT

Embodiments of the present invention relate to a method for producing materials having the formula $Li[Ni_{0.5}Mn_{1.5}]O_{4-\delta}$ wherein $\delta \geq 0$, the materials obtainable by such method, and cathodes and batteries comprising such materials.

15 Claims, 11 Drawing Sheets

PUBLICATIONS

Kannan, A. M.; Manthiram, A. *Electrochem. Solid-State Lett.* 2002, 5, A167.

Song, D.; Ikuta, H.; Uchida, T.; Wakihara, M. *Solid State Ionics* 1999, 117, 151.

Shaju, K. M.; Subba Rao, G. V.; Chowdari, B. V. R. *Solid State Ionics* 2002, 148, 343.

Okada, M.; Lee, Y.-S.; Yoshio, M. *J. Power Sources* 2000, 90, 196.

Sun, Y. K.; Hong, K. J.; Prakash, J. *J. Electrochem. Soc.* 2003, 150, A970.

Liu, H.; Cheng, C.; Zongqiuhu; Zhang, K. *Mater. Chem. Phys.* 2007, 101, 276.

Li, C.; Zhang, H. P.; Fu, L. J.; Liu, H.; Wu, Y. P.; Rahm, E.; Holze, R.; Wu, H. Q. *Electrochim. Acta* 2006, 51, 3872.

Chen, Z.; Lu, W. Q.; Liu, J.; Amine, K. *Electrochim. Acta* 2006, 51, 3322.

Zhang, S. S.; Xu, K.; Jow, T. R. *J. Power Sources* 2006, 154, 276.

Yu, B. T.; Qiu, W. H.; Li, F. S.; Cheng, L. *J. Power Sources* 2007, 166, 499.

Shaju, K. M.; Bruce, P. G. *Adv. Mater.* 2006, 18, 2330.

Shaju, K. M.; Bruce, P. G. *J. Power Sources* 2007, 174, 1201.

Kim, J. S.; Johnson, C. S.; Vaughey, J. T.; Hackney, S. A.; Walz, K. A.; Zeltner, W. A.; Anderson, M. A.; Thackeray, M. M. *J. Electrochem. Soc.* 2004, 151, A1755.

Jiang, C. H.; Dou, S. X.; Liu, H. K.; Ichihara, M.; Zhou, H. S. *J. Power Sources* 2007, 172, 410.

Zhang, Y.; Shin, H. C.; Dong, J.; Liu, M. *Solid State Ionics* 2004, 171, 25.

Huang, S.; Wen, Z.; Yang, X.; Zhu, X.; Lin, B. *Electrochem. Solid-State Lett.* 2006, 9, A443.

Luo, J.; Cheng, L.; Xia, Y. *Electrochem. Commun.* 2007, 9, 1404.

Park, S. C.; Han, Y. S.; Kang, Y. S.; Lee, P. S.; Ahn, S.; Lee, H. M.; Lee, J. Y. *J. Electrochem. Soc.* 2001, 148, A680.

Lanz, M.; Kormann, C.; Steininger, H.; Heil, G.; Haas, O.; Novak, P. *J. Electrochem. Soc.* 2000, 147, 3997.

Wang, X.; Tanaike, O.; Kodama, M.; Hatpri, H. *J. Power Sources* 2007, 168, 282.

Chiu, K. F.; Lin, H. C.; Lin, K. M.; Chen, C. C. *J. Electrochem. Soc.* 2006, 153, A1992.

Blyr, A.; Sigala, C.; Amatucci, G.; Guyomard, D.; Chabre, Y.; Tarascon, J. M. *J. Electrochem. Soc.* 1998, 145, 194.

Sun, Y. K.; Yoon, C. S.; Kim, C. K.; Youn, S. G.; Lee, Y. S.; Yoshio, M.; Oh, I. H. *J. Mater. Chem.* 2001, 11, 2519.

Aurbach, D.; Markovsky, B.; Levi, M. D.; Levi, E.; Schechter, A.; Moshkovich, M.; Cohen, Y. *J. Power Sources* 1999, 81-82, 95.

Aurbach, D.; Gamolsky, K.; Markovsky, B.; Salitra, G.; Gofer, Y.; Heider, U.; Oesten, R.; Schmidt, M. *J. Electrochem. Soc.* 2000, 147, 1322.

Mohamedi, M.; Takahashi, D.; Uchiyama, T.; Itoh, T.; Nishizawa, M.; Uchida, I. *J. Power Sources* 2001, 93, 93.

Shaju, K. M.; Subba Rao, G. V.; Chowdari, B. V. R. *J. Mater. Chem.* 2003, 13, 106.

Dokko, K.; Mohamedi, M.; Umeda, M.; Uchida, I. *J. Electrochem. Soc.* 2003, 150, A425.

Thomas, M. G. S. R.; Bruce, P. G.; Goodenough, J. B. *J. Electrochem. Soc.* 1985, 132, 1521.

Conway, B. E. *J. Electrochem. Soc.* 1991, 138, 1539.

Choi, Y. M.; Pyun, S. I.; Bae, J. S.; Moon, S. I. *J. Power Sources* 1995, 56, 25.

Edstrom, K.; Gustafsson, T.; Thomas, J. O. *Electrochim. Acta* 2004, 50, 397.

Eriksson, T.; Gustafsson, T.; Thomas, J. O. *Electrochem. Solid-State Lett.* 2002, 5, A35.

Tronel, F.; Guerlou-Demourgues, L.; Menetrier, M.; Croguennec, L.; Goubault, L.; Bernard, P.; Delmas, C. *Chem. Mater.* 2006, 18, 5840.

K. Ariyoshi and T. Ohzuku, *J. Power Sources*, 2007, 174, 1258.

P. G. Bruce, B. Scrosati and J. M. Tarascon, *Angew. Chem., Int. Ed.*, 2008, 47, 2930.

Q. M. Zhong, A. Bonakdarpour, M. J. Zhang, Y. Gao and J. R. Dahn, *J. Electrochem. Soc.*, 1997, 144, 205.

K. Amine, H. Tukamoto, H. Yasuda and Y. Fujita, *J. Power Sources*, 1997, 68, 604.

J. M. Tarascon, E. Wang, F. K. Shokoohi, W. R. McKinnon and S. Colson, *J. Electrochem. Soc.*, 1991, 138, 2859.

H. Kawai, M. Nagata, H. Tukamoto and A. R. West, *J. Power Sources*, 1999, 81-82, 67.

T. Ohzuku, S. Takeda and M. Iwanaga, *J. Power Sources*, 1999, 81-82, 90.

M. Kunduraci, J. F. Al-Sharab and G. G. Amatucci, *Chem. Mater.*, 2006, 18, 3585.

J.-H. Kim, S.-T. Myung, C. S. Yoon, S. G. Kang and Y.-K. Sun, *Chem. Mater.*, 2004, 16, 906.

S.-H. Park and Y.-K. Sun, *Electrochim. Acta*, 2004, 50, 431.

K. Ariyoshi, Y. Iwakoshi, N. Nakayama and T. Ohzuku, *J. Electrochem. Soc.*, 2004, 151, A296.

K. Takahashi, M. Saitoh, M. Sano, M. Fujita and K. Kifune, *J. Electrochem. Soc.*, 2004, 151, A173.

F. G. B. Ooms, M. Wagemaker, A. A. Van Well, F. M. Mulder, E. M. Kelder and J. Schoonman, *Appl. Phys. A*, 2002, 74, S1089.

M. Kunduraci and G. G. Amatucci, *J. Electrochem. Soc.*, 2006, 153, A1345.

Y. Idemoto, H. Narai and N. Koura, *J. Power Sources*, 2003, 119-121, 125.

S. H. Park, S. W. Oh, S. H. Kang, I. Belharouak, K. Amine and Y. K. Sun, *Electrochim. Acta*, 2007, 52, 7226.

J. H. Kim, C. S. Yoon, S. T. Myung, J. Prakash and Y. K. Sun, *Electrochem. Solid-State Lett.*, 2004, 7, A216.

R. Alcantara, M. Jaraba, P. Lavela, J. L. Tirado, E. Zhecheva and R. Stoyanova, *Chem. Mater.*, 2004, 16, 1573.

H. Fang, Z. Wang, B. Zhang, X. Li and G. Li, *Electrochem. Commun.*, 2007, 9, 1077.

D. Pasero, N. Reeves, V. Pralong and A. R. West, *J. Electrochem. Soc.*, 2008, 155, A282.

L. J. Fu, H. Liu, C. Li, Y. P. Wu, E. Rahm, R. Holze and H. Q. Wu, *Prog. Mater. Sci.*, 2005, 50, 881.

Y.-K. Sun, Y.-S. Lee, M. Yoshio and K. Amine, *Electrochem. Solid-State Lett.*, 2002, 5, A99.

Y. Talyosef, B. Markovsky, R. Lavi, G. Salitra, D. Aurbach, D. Kovacheva, M. Gorova, E. Zhecheva and R. Stoyanova, *J. Electrochem. Soc.*, 2007, 154, A682.

M. G. Lazarraga, L. Pascual, H. Gadjov, D. Kovacheva, K. Petrov, J. M. Amarilla, R. M. Rojas, M. A. Martin-Luengo and J. M. Rojo, *J. Mater. Chem.*, 2004, 14, 1640.

J. C. Arrebola, A. Caballero, M. Cruz, L. Hernan, J. Morales and E. R. Castellon, *Adv. Funct. Mater.*, 2006, 16, 1904.

R. Alcantra, M. Jaraba, P. Lavela and J. L. Tirado, *J. Electroanal. Chem.*, 2004, 566, 187.

D. Aurbach, B. Markovsky, Y. Talyossef, G. Salitra, H.-J. Kim and S. Choi, *J. Power Sources*, 2006, 162, 780.

S. H. Oh, S. H. Jeon, W. I. cho, C. S. Kim and B. W. Cho, *J. Alloys Compd.*, 2008, 452, 389.

L. Xiao, Y. Zhao, Y. Yang, X. Ai, H. Yang and Y. Cao, *J. Solid State Electrochem.*, 2008, 12, 687.

J. C. Arrebola, A. Caballero, L. Hernan and J. Morales, *J. Power Sources*, 2008, 180, 852.

K. M. Shaju and P. G. Bruce, *Adv. Mater.*, 2006, 18, 2330.

K. M. Shaju and P. G. Bruce, *J. Power Sources*, 2007, 174, 1201.

H. Fang, L. Li and G. Li, *J. Power Sources*, 2007, 167, 223.

S. Patoux, L. Sannier, H. Lignier, Y. Reynier, C. Bourbon, S. Jouanneau, F. L. Cras and S. Martinet, *Electrochim. Acta*, 2008, 53, 4137.

T. A. Arunkumar and A. Manthiram, *Electrochem. Solid-State Lett.*, 2005, 8, A403.

H. M. Wu, J. P. Tu, Y. F. Yuan, Y. Li, X. B. Zhao and G. S. Cao, *Electrochemim. Acta*, 2005, 50, 4104.

D. Li, A. Ito, K. Kobayakawa, H. Noguchi and Y. Sato, *Electrochim. Acta*, 2007, 52, 1919.

D. Aurbach, M. D. Levi, K. Gamulski, B. Markovsky, G. Salitra, E. Levi, U. Heider, L. Heider and R. Oesten, *J. Power Sources*, 1999, 81-82, 472.

K. M. Shaju, G. V. SubbaRao and B. V. R. Chowdari, *J. Mater. Chem.*, 2003, 13, 106.

M. Mohamedi, D. Takahashi, T. Uchiyama, T. Itoh, M. Nishizawa and I. Uchida, *J. Power Sources*, 2001, 93, 93.

\* cited by examiner

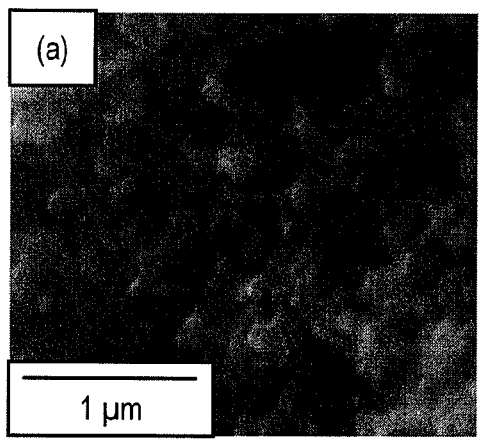 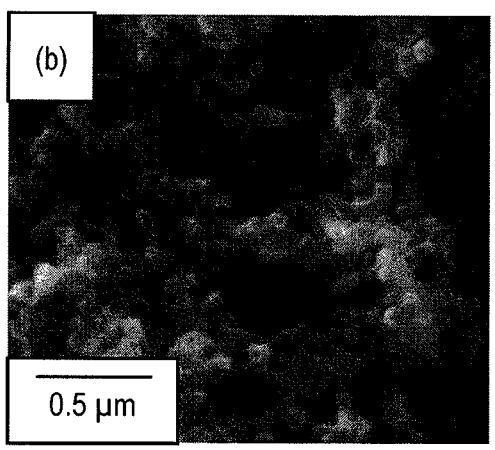
FIG. 2a  FIG. 2b
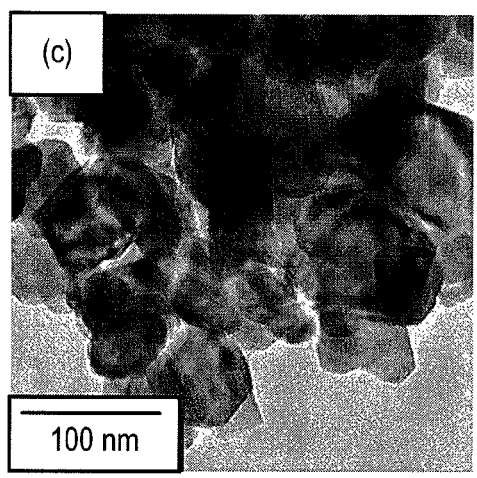 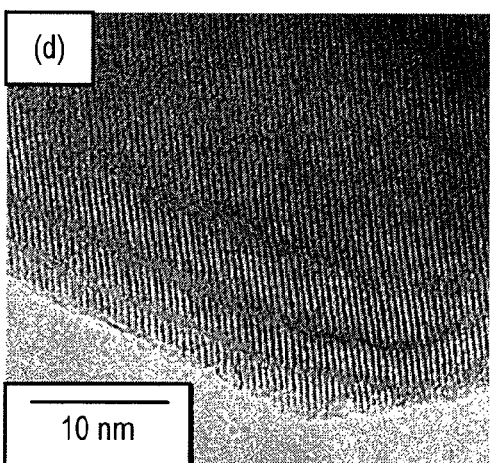
FIG. 2c  FIG. 2d
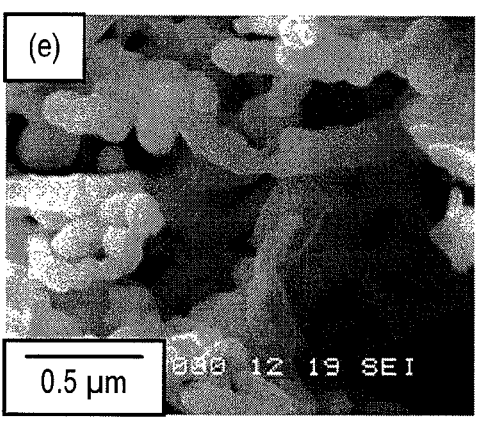 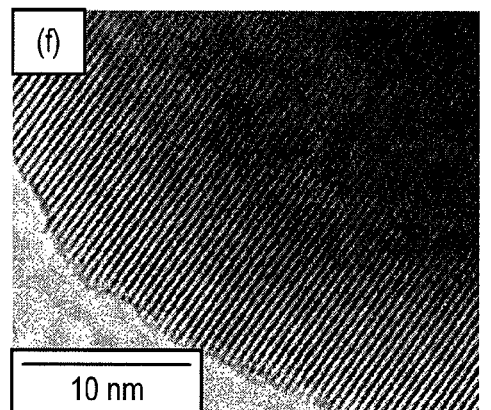
FIG. 2e  FIG. 2f

CATHODE MATERIALS AND METHODS FOR PRODUCTION

RELATED APPLICATIONS

This application claims priority under 35 U.S.C. §119(e) to U.S. Provisional Application No. 61/234,106 filed on Aug. 14, 2009.

BACKGROUND OF THE INVENTION

1. Field of the Invention

Embodiments of the present invention relate to a method for producing stoichiometric $LiMn_2O_4$, the material produced thereby, a cathode formed from the material and a battery containing the cathode. The invention also relates to a stoichiometric $LiMn_2O_4$ arranged into a structure comprising fused particles, a cathode formed from the material and a battery containing the cathode. In further embodiments, the invention relates to a method for producing a material having the formula $Li[Ni_{0.5}Mn_{1.5}]O_{4-\delta}$ wherein $\delta \geqq 0$. In further embodiments, the invention relates to a material having the formula $Li[Ni_{0.5}Mn_{1.5}]O_{4-\delta}$ wherein $\delta \geqq 0$, arranged into a structure comprising fused particles, the material produced thereby, a cathode formed from the material and a battery containing the cathode.

2. Description of the Related Art

Future rechargeable lithium batteries require lithium intercalation cathodes that combine low cost, low toxicity, and high safety with high rates of intercalation/deintercalation. The lithium intercalation compounds $LiFePO_4$ olivine and $LiMn_2O_4$ spinel have received particular attention in this regard. The latter has been studied as an intercalation electrode for many years and exhibits a potential of 4 V versus Li+(1 M)/Li when cycled over the composition range of $Li_xMn_2O_4$, $0<x<1$. Early work soon identified that stoichiometric $LiMn_2O_4$ shows considerable capacity fading on cycling, associated with structural degradation, and poor rate performance. As a result, attention turned to nonstoichiometric spinels such as $Li_{1.05}Mn_{1.95}O_4$, which demonstrate better cycling stability despite lower theoretical and practical capacities due to a Mn valence >3.5. These materials failed to show sufficient stability on cycling at elevated temperatures (150° C.) resulting in the study of even less stoichiometric compositions, i.e., more Li-rich further compromising capacity, doping with foreign ions (e.g., F-, transition metals), application of coatings (e.g., ZnO, $LiCoO_2$), or utilization of electrolyte additives or different electrolytes.

In addition, to achieve the goal of new rechargeable lithium batteries for new markets, there is interest in moving the electrochemical window within which such devices operate from the present 0 to 3.5-4.0 V versus Li+(1 M)/Li to 1 to 1.5-5 V versus Li+(1 M)/Li, primarily for reasons of safety and overcharge protection. This involves replacing the current negative and positive electrode materials, graphite and $LiCoO_2$, respectively, with new lithium intercalation materials operating satisfactorily in the higher voltage regime. For the negative electrode, titanates are favoured e.g., the spinel $Li_4Ti_5O_{12}$ or $TiO_2$—(B) (~1.5 V versus Li+(1 M)/Li). The $Li[Ni_{0.5}Mn_{1.5}]O_4$ spinel is one of the most promising candidates as the positive electrode. It exhibits stable intercalation-deintercaltion of lithium at ~4.7 V versus Li+(1 M)/Li.

Background information relating to $LiMn_2O_4$ can be found in the following sources; some of these references are referred to in Tables 1 and 2:

(1) Padhi, A. K.; Nanjundaswamy, K. S.; Goodenough, J. B. *J. Electrochem. Soc.* 1997, 144, 1188.

(2) (a) Thackeray, M. M.; Johnson, P. J.; Depicciotto, L. A.; Bruce, P. G.; Goodenough, J. B. *Mater. Res. Bull.* 1984, 19, 179. (b) Thackeray, M. M. *Prog. Solid State Chem.* 1997, 25, 1. (c) Tarascon, J. M.; Guyomard, D. *J. Electrochem. Soc.* 1991, 138, 2864.

(3) (a) a Pasquier, A. D.; Blyr, A.; Courjal, P.; Larcher, D.; Amatucci, G.; Gerand, B.; Tarascon, J. M. *J. Electrochem. Soc.* 1999, 146, 428. (b) Amatucci, G.; Tarascon, J. M. *J. Electrochem. Soc.* 2002, 149, K31. (c) Huang, H.; Vincent, C. A.; Bruce, P. G. *J. Electrochem. Soc.* 1999, 146, 3649. (d) Shin, Y.; Manthiram, A. *J. Electrochem. Soc.* 2004, 151, A204.

(4) (a) Cho, J.; Thackeray, M. M. *J. Electrochem. Soc.* 1999, 146, 3577. (b) Xia, Y.; Sakai, T.; Fujieda, T.; Yang, X. Q.; Sun, X.; Ma, Z. F.; McBreen, J.; Yoshio, M. *J. Electrochem. Soc.* 2001, 148, A723. (c) Takada, T.; Hayakawa, H.; Enoki, H.; Akiba, E.; Slegr, H.; Davidson, I.; Murray, J. *J. Power Sources* 1999, 81-82, 505. (d) Thackeray, M. M.; Yang, S. H.; Kahaian, A. J.; Kepler, K. D.; Skinner, E.; Vaughey, J. T.; Hackney, S. A. *Electrochem. Solid-State Lett.* 1998, 1, 7.

(5) Xia, Y.; Zhou, Y.; Yoshio, M. *J. Electrochem. Soc.* 1997, 144, 2593.

(6) Amatucci, G. G.; Pereira, N.; Zheng, T.; Tarascon, J. M. *J. Electrochem. Soc.* 2001, 148, A171.

(7) Larcher, D.; Gerand, B.; Tarascon, J. M. *J. Solid State Electrochem.* 1998, 2, 137.

(8) Shin, Y.; Manthiram, A. *Chem. Mater.* 2003, 15, 2954.

(9) Kannan, A. M.; Manthiram, A. *Electrochem. Solid-State Lett.* 2002, 5, A167.

(10) (a) Song, D.; Ikuta, H.; Uchida, T.; Wakihara, M. *Solid State Ionics* 1999, 117, 151. (b) Shaju, K. M.; Subba Rao, G. V.; Chowdari, B. V. R. *Solid State Ionics* 2002, 148, 343. (c) Okada, M.; Lee, Y.-S.; Yoshio, M. *J. Power Sources* 2000, 90, 196.

(11) Sun, Y. K.; Hong, K. J.; Prakash, J. *J. Electrochem. Soc.* 2003, 150, A970.

(12) Liu, H.; Cheng, C.; Zongqiuhu; Zhang, K. *Mater. Chem. Phys.* 2007, 101, 276.

(13) Li, C.; Zhang, H. P.; Fu, L. J.; Liu, H.; Wu, Y. P.; Rahm, E.; Holze, R.; Wu, H. Q. *Electrochim. Acta* 2006, 51, 3872.

(14) (a) Chen, Z.; Lu, W. Q.; Liu, J.; Amine, K. *Electrochim. Acta* 2006, 51, 3322. (b) Zhang, S. S.; Xu, K.; Jow, T. R. *J. Power Sources* 2006, 154, 276. (c) Yu, B. T.; Qiu, W. H.; Li, F. S.; Cheng, L. *J. Power Sources* 2007, 166, 499.

(15) (a) Shaju, K. M.; Bruce, P. G. *Adv. Mater.* 2006, 18, 2330. (b) Shaju, K. M.; Bruce, P. G. *J. Power Sources* 2007, 174, 1201.

(16) Kim, J. S.; Johnson, C. S.; Vaughey, J. T.; Hackney, S. A.; Walz, K. A.; Zeltner, W. A.; Anderson, M. A.; Thackeray, M. M. *J. Electrochem. Soc.* 2004, 151, A1755.

(17) Jiang, C. H.; Dou, S. X.; Liu, H. K.; Ichihara, M.; Zhou, H. S. *J. Power Sources* 2007, 172, 410.

(18) Zhang, Y.; Shin, H. C.; Dong, J.; Liu, M. *Solid State Ionics* 2004, 171, 25.

(19) Huang, S.; Wen, Z.; Yang, X.; Zhu, X.; Lin, B. *Electrochem. Solid-State Lett.* 2006, 9, A443.

(20) Luo, J.; Cheng, L.; Xia, Y. *Electrochem. Commun.* 2007, 9, 1404.

(21) Park, S. C.; Han, Y. S.; Kang, Y. S.; Lee, P. S.; Ahn, S.; Lee, H. M.; Lee, J. Y. *J. Electrochem. Soc.* 2001, 148, A680.

(22) Lanz, M.; Kormann, C.; Steininger, H.; Heil, G.; Haas, O.; Novak, P. *J. Electrochem. Soc.* 2000, 147, 3997.

(23) Wang, X.; Tanaike, O.; Kodama, M.; Hatpri, H. *J. Power Sources* 2007, 168, 282.

(24) Chiu, K. F.; Lin, H. C.; Lin, K. M.; Chen, C. C. *J. Electrochem. Soc.* 2006, 153, A1992.

(25) (a) Blyr, A.; Sigala, C.; Amatucci, G.; Guyomard, D.; Chabre, Y.; Tarascon, J. M. *J. Electrochem. Soc.* 1998, 145, 194. (b) Sun, Y. K.; Yoon, C. S.; Kim, C. K.; Youn, S. G.; Lee, Y. S.; Yoshio, M.; Oh, I. H. *J. Mater. Chem.* 2001, 11, 2519.

(26) (a) Aurbach, D.; Markovsky, B.; Levi, M. D.; Levi, E.; Schechter, A.; Moshkovich, M.; Cohen, Y. *J. Power Sources* 1999, 81-82, 95. (b) Aurbach, D.; Gamolsky, K.; Markovsky, B.; Salitra, G.; Gofer, Y.; Heider, U.; Oesten, R.; Schmidt, M. *J. Electrochem. Soc.* 2000, 147, 1322.

(27) (a) Mohamedi, M.; Takahashi, D.; Uchiyama, T.; Itoh, T.; Nishizawa, M.; Uchida, I. *J. Power Sources* 2001, 93, 93. (b) Shaju, K. M.; Subba Rao, G. V.; Chowdari, B. V. R. *J. Mater. Chem.* 2003, 13, 106. (c) Dokko, K.; Mohamedi, M.; Umeda, M.; Uchida, I. *J. Electrochem. Soc.* 2003, 150, A425.

(28) (a) Thomas, M. G. S. R.; Bruce, P. G.; Goodenough, J. B. *J. Electrochem. Soc.* 1985, 132, 1521. (b) Conway, B. E. *J. Electrochem. Soc.* 1991, 138, 1539. (c) Choi, Y. M.; Pyun, S. I.; Bae, J. S.; Moon, S. I. *J. Power Sources* 1995, 56, 25.

(29) (a) Edstrom, K.; Gustafsson, T.; Thomas, J. O. *Electrochim. Acta* 2004, 50, 397. (b) Eriksson, T.; Gustafsson, T.; Thomas, J. O. *Electrochem. Solid-State Lett.* 2002, 5, A35.

(30) Tronel, F.; Guerlou-Demourgues, L.; Menetrier, M.; Croguennec, L.; Goubault, L.; Bernard, P.; Delmas, C. *Chem. Mater.* 2006, 18, 5840.

Background information relating to $Li[Ni_{0.5}Mn_{1.5}]O_4$ can be found in the following sources; some of these references are referred to herein by recitation of the number of the reference in superscripted font:

(1*) K. Ariyoshi and T. Ohzuku, *J. Power Sources*, 2007, 174, 1258.

(2*) K. Ariyoshi, R. Yamato, Y. Makimura, T. Amazutsumi, Y. Maeda and T. Ohzuku, *Electrochemistry*, 2008, 76, 46.

(3*) P. G. Bruce, B. Scrosati and J. M. Tarascon, *Angew. Chem., Int. Ed.*, 2008, 47, 2930.

(4*) Q. M. Zhong, A. Bonakdarpour, M. J. Zhang, Y. Gao and J. R. Dahn, *J. Electrochem. Soc.*, 1997, 144, 205.

(5*) K. Amine, H. Tukamoto, H. Yasuda and Y. Fujita, *J. Power Sources*, 1997, 68, 604.

(6*) J. M. Tarascon, E. Wang, F. K. Shokoohi, W. R. McKinnon and S. Colson, *J. Electrochem. Soc.*, 1991, 138, 2859.

(7*) H. Kawai, M. Nagata, H. Tukamoto and A. R. West, *J. Power Sources*, 1999, 81-82, 67.

(8*) T. Ohzuku, S. Takeda and M. Iwanaga, *J. Power Sources*, 1999, 81-82, 90.

(9*) M. Kunduraci, J. F. Al-Sharab and G. G. Amatucci, *Chem. Mater.*, 2006, 18, 3585.

(10*) J.-H. Kim, S.-T. Myung, C. S. Yoon, S. G. Kang and Y.-K. Sun, *Chem. Mater.*, 2004, 16, 906.

(11*) S.-H. Park and Y.-K. Sun, *Electrochim. Acta*, 2004, 50, 431.

(12*) K. Ariyoshi, Y. Iwakoshi, N. Nakayama and T. Ohzuku, *J. Electrochem. Soc.*, 2004, 151, A296.

(13*) K. Takahashi, M. Saitoh, M. Sano, M. Fujita and K. Kifune, *J. Electrochem. Soc.*, 2004, 151, A173.

(14*) F. G. B. Ooms, M. Wagemaker, A. A. Van Well, F. M. Mulder, E. M. Kelder and J. Schoonman, *Appl Phys. A*, 2002, 74, S1089.

(15*) M. Kunduraci and G. G. Amatucci, *J. Electrochem. Soc.*, 2006, 153, A1345.

(16*) Y. Idemoto, H. Narai and N. Koura, *J. Power Sources*, 2003, 119-121, 125.

(17*) S. H. Park, S. W. Oh, S. H. Kang, I. Belharouak, K. Amine and Y. K. Sun, *Electrochim. Acta*, 2007, 52, 7226.

(18*) J. H. Kim, C. S. Yoon, S. T. Myung, J. Prakash and Y. K. Sun, *Electrochem. Solid-State Lett.*, 2004, 7, A216.

(19*) R. Alcantara, M. Jaraba, P. Lavela, J. L. Tirado, E. Zhecheva and R. Stoyanova, *Chem. Mater.*, 2004, 16, 1573.

(20*) H. Fang, Z. Wang, B. Zhang, X. Li and G. Li, *Electrochem. Commun.*, 2007, 9, 1077.

(21*) D. Pasero, N. Reeves, V. Pralong and A. R. West, *J. Electrochem. Soc.*, 2008, 155, A282.

(22*) L. J. Fu, H. Liu, C. Li, Y. P. Wu, E. Rahm, R. Holze and H. Q. Wu, *Prog. Mater. Sci.*, 2005, 50, 881.

(23)* Y.-K. Sun, Y.-S. Lee, M. Yoshio and K. Amine, *Electrochem. Solid-State Lett.*, 2002, 5, A99.

(24*) Y. Talyosef, B. Markovsky, R. Lavi, G. Salitra, D. Aurbach, D. Kovacheva, M. Gorova, E. Zhecheva and R. Stoyanova, *J. Electrochem. Soc.*, 2007, 154, A682.

(25*) M. G. Lazarraga, L. Pascual, H. Gadjov, D. Kovacheva, K. Petrov, J. M. Amarilla, R. M. Rojas, M. A. Martin-Luengo and J. M. Rojo, *J. Mater. Chem.*, 2004, 14, 1640.

(26*) J. C. Arrebola, A. Caballero, M. Cruz, L. Hernan, J. Morales and E. R. Castellon, *Adv. Funct. Mater.*, 2006, 16, 1904.

(27*) R. Alcantra, M. Jaraba, P. Lavela and J. L. Tirado, *J. Electroanal. Chem.*, 2004, 566, 187.

(28*) D. Aurbach, B. Markovsky, Y. Talyossef, G. Salitra, H.-J. Kim and S. Choi, *J. Power Sources*, 2006, 162, 780.

(29*) S. H. Oh, S. H. Jeon, W. I. cho, C. S. Kim and B. W. Cho, *J. Alloys Compd.*, 2008, 452, 389.

(30*) L. Xiao, Y. Zhao, Y. Yang, X. Ai, H. Yang and Y. Cao, *J. Solid State Electrochem.*, 2008, 12, 687.

(31*) J. C. Arrebola, A. Caballero, L. Hernan and J. Morales, *J. Power Sources*, 2008, 180, 852.

(32*) K. M. Shaju and P. G. Bruce, *Adv. Mater.*, 2006, 18, 2330.

(33*) K. M. Shaju and P. G. Bruce, *J. Power Sources*, 2007, 174, 1201.

(34*) H. Fang, L. Li and G. Li, *J. Power Sources*, 2007, 167, 223.

(35*) S. Patoux, L. Sannier, H. Lignier, Y. Reynier, C. Bourbon, S. Jouanneau, F. L. Cras and S. Martinet, *Electrochim. Acta*, 2008, 53, 4137.

(36*) T. A. Arunkumar and A. Manthiram, *Electrochem. Solid-State Lett.*, 2005, 8, A403.

(37*) H. M. Wu, J. P. Tu, Y. F. Yuan, Y. Li, X. B. Zhao and G. S. Cao, *Electrochemim. Acta*, 2005, 50, 4104.

(38*) D. Li, A. Ito, K. Kobayakawa, H. Noguchi and Y. Sato, *Electrochim. Acta*, 2007, 52, 1919.

(39*) D. Aurbach, M. D. Levi, K. Gamulski, B. Markovsky, G. Salitra, E. Levi, U. Heider, L. Heider and R. Oesten, *J. Power Sources*, 1999, 81-82, 472.

(40*) K. M. Shaju, G. V. SubbaRao and B. V. R. Chowdari, *J. Mater. Chem.*, 2003, 13, 106.

(41*) M. Mohamedi, D. Takahashi, T. Uchiyama, T. Itoh, M. Nishizawa and I. Uchida, *J. Power Sources*, 2001, 93, 93.

SUMMARY OF THE INVENTION

A method is disclosed for producing a material comprising nano-$Li[Ni_{0.5}Mn_{1.5}]O_{4-\delta}$, the method comprising dissolving lithium, nickel and manganese salts in an aqueous solution of resorcinol and formaldehyde; and heating the resultant mixture. In some embodiments, $\delta \geq 0$. In other embodiments, $4 > \delta > 0$. The amounts of lithium, nickel and manganese salts dissolved in the aqueous solution preferably correspond to the stoichiometry of $Li[Ni_{0.5}Mn_{1.5}]O_{4-\delta}$. The resultant mixture preferably has a molar ratio of $Li[Ni_{0.5}Mn_{1.5}]O_{4-\delta}$:resorcinol:formaldehyde of about 0.02:0.1:0.15.

In one embodiment of the method, the lithium, nickel and manganese salts are dissolved in quantities corresponding to about 0.02 mols of the desired stoichiometry of Li[Ni$_{0.5}$Mn$_{1.5}$]O$_{4-\delta}$ per 100 mL of water containing about 0.1 mol of resorcinol and about 0.15 mol of formaldehyde.

In one embodiment of the method, heating the resultant mixture comprises at least two stages of heating, wherein the temperature increases in each stage of heating relative to the previous stage. Heating the resultant mixture may comprise a first stage of heating until the resultant mixture gels and a second stage of heating until the gelled mixture solidifies. In a preferred embodiment, the first stage of heating occurs at about 60° C. for about 30-60 minutes and a second stage of heating occurs at about 90° C. for about 24 hrs.

In a preferred embodiment, the method further comprises the steps of grinding the solidified mixture; and then calcinating the ground mixture in air at a temperature of about 700-800° C. for about 12-15 hrs. Calcinating the ground mixture at a temperature of about 700° C. results in an ordered lithium nickel manganese oxide spinel structure, whereas calcinating the ground mixture at a temperature of about 750° C. results in an disordered lithium nickel manganese oxide spinel structure.

A material comprising Li[Ni$_{0.5}$Mn$_{1.5}$]O$_{4-\delta}$, which is obtainable by any of the above-described methods, is also disclosed in accordance with aspects of the invention, wherein $\delta \geq 0$ or $4 > \delta > 0$. In a preferred variation, a disordered lithium nickel manganese oxide material, which is obtainable by any of the above-described methods, is disclosed wherein the material exhibits an initial capacity of at least about 129 mA h g$^{-1}$ at 10 C and at least about 118 mA h g$^{-1}$ at 20 C.

A material comprising Li[Ni$_{0.5}$Mn$_{1.5}$]O$_{4-\delta}$, wherein $\delta \geq 0$, is disclosed wherein the material comprises nanoparticles fused together to form a porous morphology, wherein the average particle size is about 1-100 nm, and/or wherein the average pore size is about 1-10 μm. In a variation to the material, $4 > \delta > 0$.

A cathode comprising a Li[Ni$_{0.5}$Mn$_{1.5}$]O$_{4-\delta}$ material, and a lithium ion battery comprising such a cathode is also disclosed in accordance with aspects of the invention.

BRIEF DESCRIPTION OF THE DRAWINGS

Various aspects of the invention will now be described by way of example only with reference to the accompanying drawings, of which:

FIG. 2(a) is a scanning electron microscope (SEM) image of as-prepared nano-LiMn$_2$O$_4$;

FIG. 2(b) is a SEM image of a nano-LiMn$_2$O$_4$ electrode after 50 cycles between 3.5 and 4.3 V at 74 mA g$^{-1}$;

FIG. 2(c) is a transmission electron microscope (TEM) image of as-prepared nano-LiMn2O4;

FIG. 2(d) is a TEM image of as-prepared nano-LiMn$_2$O$_4$;

FIG. 2(e) is a SEM image of as-prepared sol-gel LiMn$_2$O$_4$;

FIG. 2(f) is a TEM image of as-prepared sol-gel LiMn$_2$O$_4$;

DETAILED DESCRIPTION OF THE PREFERRED EMBODIMENT

Figure 1A:
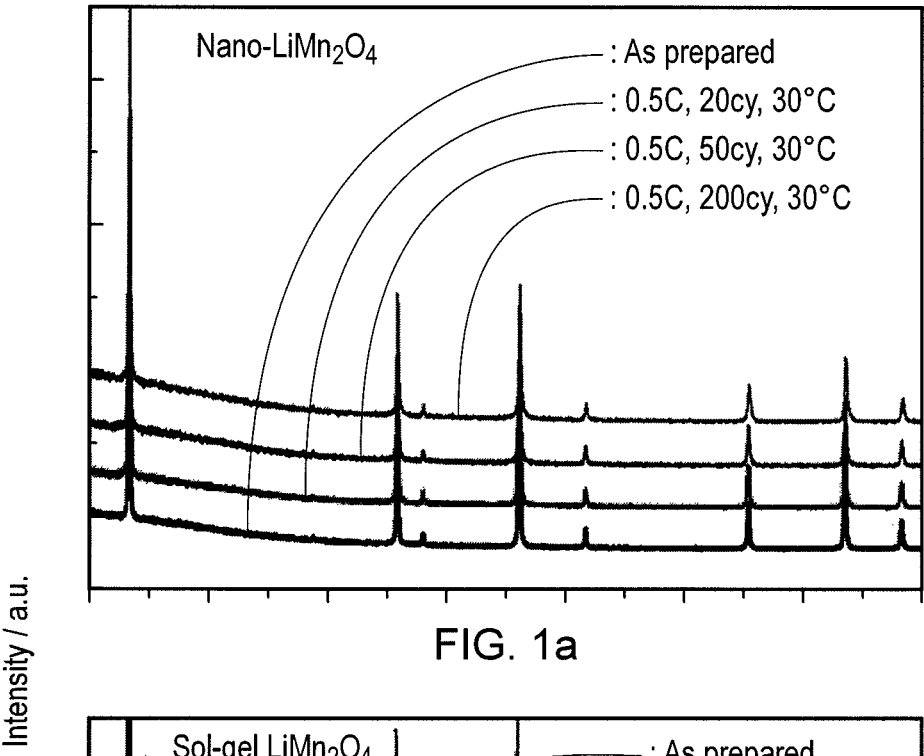
FIG. 1(a) shows powder X-ray diffraction patterns of the as-prepared samples and at the end of discharge after cycling at 30° C. to 20, 50, and 200 cycles (74 mA g$^{-1}$ (C/2) 3.5-4.3 V) for nano-LiMn$_2$O$_4$.

Described herein are first and second embodiments of lithium intercalation cathode materials, nano-LiMn$_2$O$_4$ and nano-Li[Ni$_{0.5}$Mn$_{1.5}$]O$_4$ spinels.

Nano-LiMn$_2$O$_4$ Spinel

The synthesis of stoichiometric LiMn$_2$O$_4$ by a one-pot resorcinol-formaldehyde route, resulting in a material composed of nanoparticles fused together, thus forming a porous morphology. The material, hereafter referred to as nano-LiMn$_2$O$_4$, exhibits good rate performance, as might be expected due to its nanomorphology, but also excellent capacity retention on cycling at 30 and 50° C., no structural degradation, and low Mn dissolution. Such behavior is in contrast to that generally observed for stoichiometric LiMn$_2$O$_4$ prepared by other methods, whether composed of nanometer or micrometer particles.

Synthesis of nano-LiMn$_2$O$_4$ was carried out by dissolving LiCH$_3$COO.2H$_2$O and Mn(CH$_3$COO)$_2$4H$_2$O (Fluka; ≧99%) in quantities corresponding to 0.02 mol of stoichiometric LiMn$_2$O$_4$ in 100 mL of water containing 0.1 mol of resorcinol (Fluka 99%) and 0.15 mol of formaldehyde (Fluka 36.5% in water, methanol stabilized). The mixture was then heated at 60° C. until viscous, then 90° C. for 24 h, followed by calcination at 750° C. for 12 h to obtain nano-LiMn$_2$O$_4$. All procedures were carried out in air.

Comparative prior art sol-gel LiMn$_2$O$_4$ powders were prepared by a sol-gel method following a known procedure with cation ratio of Li/Mn=1.0:2.0, using the method described in Sun, Y. K.; Hong, K. J.; Prakash, J. *J. Electrochem. Soc.* 2003, 150, A970.

Powder X-ray diffraction (PXRD) was carried out using a Stoe STADI/P diffractometer operating in transmission mode using an Fe source. Lattice parameters were obtained from PXRD data by Rietveld refinement using FullProf. Chemical analysis was carried out by inductively coupled plasma atomic emission spectrometry (ICP-AES) and was performed at the CNRS facility in Vernaison (France). Morphological studies were conducted using a Jeol JSM-5600 scanning electron microscope (SEM) and Jeol JEM-2011 transmission electron microscope (TEM). Surface area measurements were obtained using the Brunauer, Emmett, and Teller (BET) method employing a Micromeritics Gemini 23670 instrument and nitrogen gas. The oxidation state of manganese in LiMn$_2$O$_4$ was determined by the iodometric titration method as described in Tronel, F.; Guerlou-Demourgues, L.; Menetrier, M.; Croguennec, L.; Goubault, L.; Bernard, P.; Delmas, C. *Chem. Mater.* 2006, 18, 5840, which is incorporated by reference. The carbon content was determined by CHN analysis (CE Instrument, EA 1110 CHNS).

To evaluate electrochemical performance, coin cells (NRC 2325) were assembled employing a composite electrode (active material, Kynar 2801 (a copolymer based on PVDF) and super S carbon, in the weight ratios of 76:12:12 with typical active material loading of 6-7 mg cm$^{-2}$) with lithium metal as the counter electrode and LP30 (Merck; 1 M LiPF$_6$ in 1:1 v/v ethylene carbonate/dimethylene carbonate (EC/DMC)) as electrolyte, as described in Shaju, K. M.; Bruce, P. G. *Adv. Mater.* 2006, 18, 2330 and Shaju, K. M.; Bruce, P. G. *J. Power Sources* 2007, 174, 1201, both of which are incorporated by reference. Electrochemical measurements at 30 and 50 (±1)° C. were carried out using a Maccor series 4200 battery cycler. The ac impedance measurements were conducted on three-electrode cells with lithium metal as the counter and reference electrodes and LP30 as electrolyte. Data were collected using a Solartron 1255 frequency response analyzer coupled with Solartron 1286 electrochemical interface. A perturbation voltage of 5 mV and frequency range from 50 kHz to 10 mHz were employed.

Figure 1B:
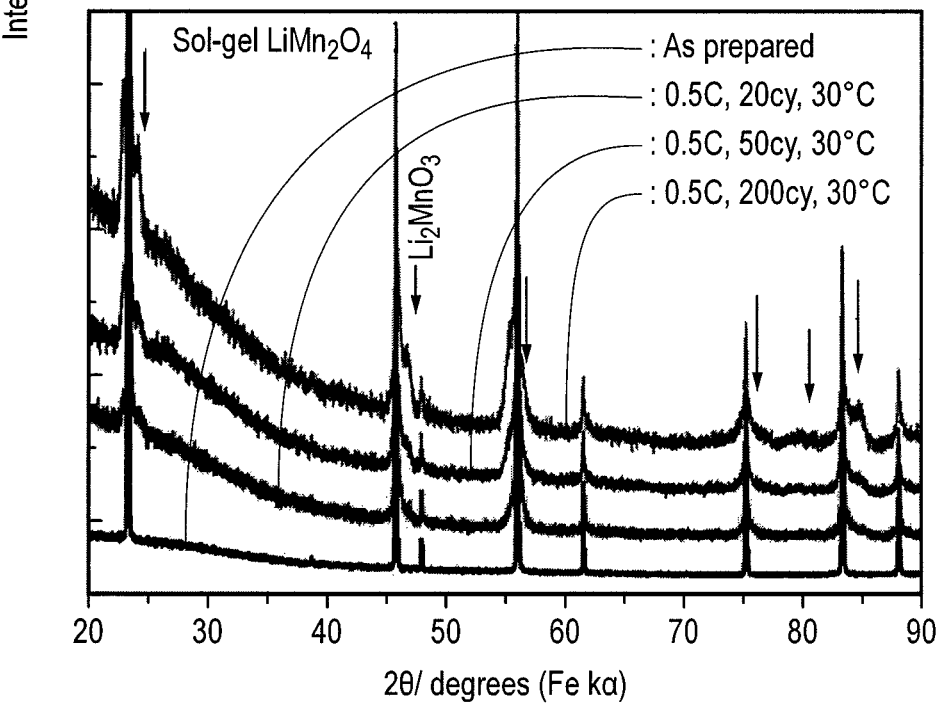
FIG. 1(b) shows powder X-ray diffraction patterns of the as-prepared samples and at the end of discharge after cycling at 30° C. to 20, 50, and 200 cycles (74 mA g$^{-1}$ (C/2) 3.5-4.3 V) for sol-gel LiMn$_2$O$_4$, with vertical arrows indicating peak positions for Li$_2$MnO$_3$.

Nano-LiMn$_2$O$_4$ was synthesized by the resorcinol-formaldehyde route described above. The PXRD pattern for this material is shown in FIG. 1 and corresponds to a single-phase LiMn$_2$O$_4$ spinel with an $\alpha_0$ lattice parameter, obtained by Rietveld refinement, of 8.237 Å, in excellent agreement with the value expected for stoichiometric LiMn$_2$O$_4$. Chemical and oxidation state analysis confirmed the stoichiometric composition, within ±1%. The CHN analysis indicated that the carbon content was negligible, i.e., below the detection limit of the instrument. The morphology, as shown in FIG. 2, is that of interconnected nanoparticles (50-100 nm) forming a porous morphology, with pores between 2-5 μm. This structure is preserved on fabricating composite electrodes and after cycling, as shown in FIG. 2. The BET surface area determined from N$_2$ desorption is 14 m$^2$ g$^{-1}$. A comparative prior art LiMn$_2$O$_4$ prepared by a sol-gel route (described in Sun, Y. K.; Hong, K. J.; Prakash, J. *J. Electrochem. Soc.* 2003, 150, A970), is hereafter referred to as sol-gel LiMn$_2$O$_4$. Although the particles of the sol-gel LiMn$_2$O$_4$ are somewhat bigger, at around 200 nm, the surface area is similar, 13 m$^2$ g$^{-1}$, compared with nano-LiMn$_2$O$_4$, implying that in the latter case the particles are more tightly fused together. The morphology is also invariant on cycling (FIG. 2(e)).

Figure 3:
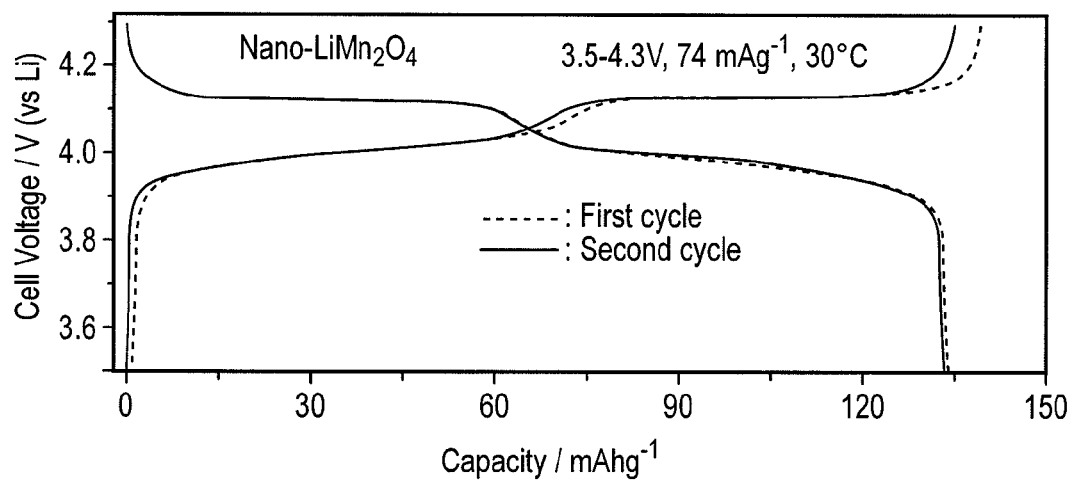
FIG. 3 shows charge and discharge voltage profiles for nano-LiMn$_2$O$_4$ at 74 mA g$^{-1}$ (~0.4 mA cm−2) between 3.5-4.3 V for the first and second cycles at 30° C.
Figure 4A:
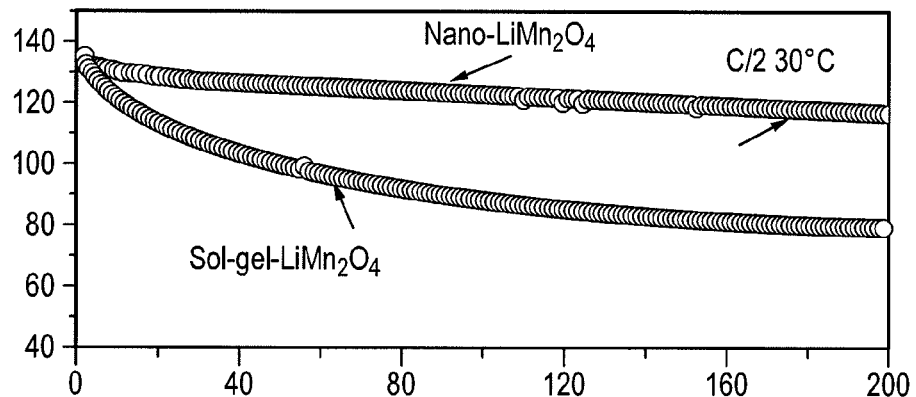
FIG. 4(a) shows the cycling performance for nano- and sol-gel LiMn$_2$O$_4$ at 30° C., rate C/2 (74 mA g$^{-1}$, ~0.4 mA cm$^{-2}$)
Figure 4B:
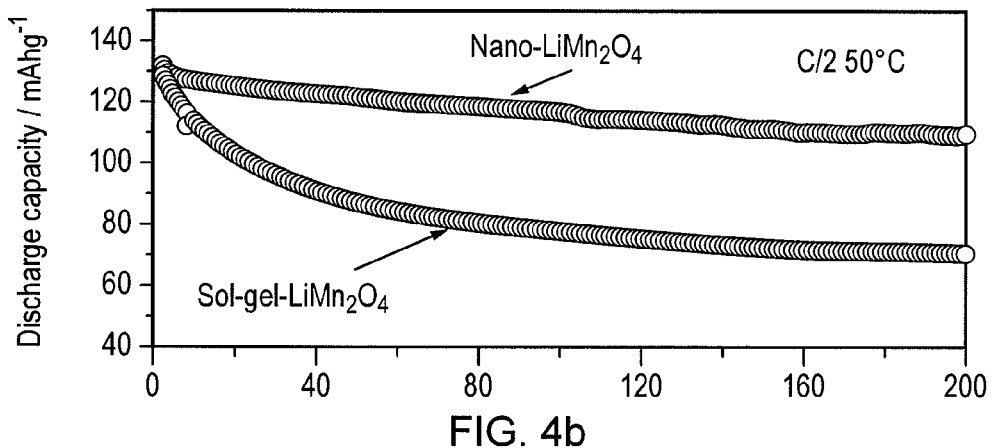
FIG. 4(b) shows the cycling performance for nano- and sol-gel LiMn$_2$O$_4$ at 50° C., rate C/2 (74 mA g$^{-1}$, ~0.4 mA cm$^{-2}$)
Figure 4C:
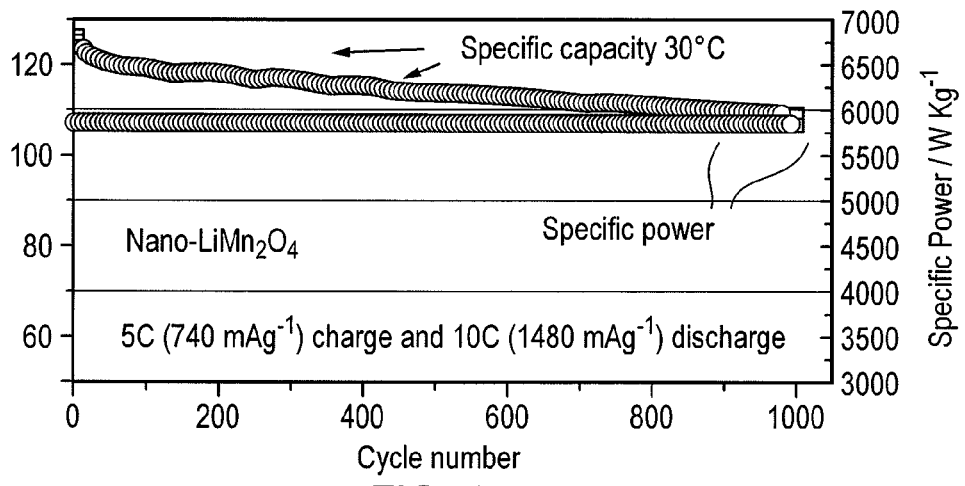
FIG. 4(c) shows performance of nano-LiMn$_2$O$_4$ at a 10 C discharge rate and 30° C.; capacity and corresponding specific power densities (calculated based on active mass) up to 1000 cycles.

Nano-LiMn$_2$O$_4$ was incorporated into a composite electrode, as described above. Charge/discharge curves collected on cycling at a rate of C/2 (C=148 mA g$^{-1}$) are shown in FIG. 3 and exhibit the well-known pair of plateaus for stoichiometric LiMn$_2$O$_4$ centered around 4 V and separated by around 100 mV. The variation of discharge capacity with cycle number, for up to 200 cycles, is shown in FIGS. 4(a) to (c) where it is compared with stoichiometric LiMn$_2$O$_4$ prepared by the above sol-gel method. All electrodes and cells were fabricated identically. The PXRD of sol-gel LiMn$_2$O$_4$ corresponds to stoichiometric spinel, $\alpha_0$=8.239 Å. The initial capacity, at a discharge rate of C/2, for nano-LiMn$_2$O$_4$ is 131 mA·g$^{-1}$, retaining a capacity of 118 mA·h g$^{-1}$ after 200 cycles (99.95% retention per cycle). In comparison, the initial cycles of sol-gel LiMn$_2$O$_4$ exhibit a capacity of 133 mA·h g$^{-1}$, fading significantly on subsequent cycles, retaining 80 mA·h g$^{-1}$ at the end of 200 cycles (99.80% retention per cycle). In accord with these results, PXRD data for sol-gel LiMn$_2$O$_4$ exhibits the structural degradation usually observed for stoichiometric LiMn$_2$O$_4$, whereas nano-LiMn$_2$O$_4$ exhibits no such degradation, as discussed later, FIG. 1. The behaviour of nano-LiMn$_2$O$_4$ at elevated temperatures has also been investigated and is presented in FIG. 4b. Capacity retention per cycle at a rate of C/2 is 99.92% and is again substantially better than sol-gel LiMn$_2$O$_4$, which exhibits a capacity retention of only 99.77% per cycle. The behaviour of nano-LiMn$_2$O$_4$ at 30 and 50° C. is not only in sharp contrast to that of sol-gel LiMn$_2$O$_4$ with the same surface area but compares favourably with the widely reported cycling performance of stoichiometric LiMn$_2$O$_4$ in general, whether composed of nanometer- or micrometer sized particles, as shown in Table 1. In fact the capacity retention resembles more closely that of surface-coated or fluorinated LiMn$_2$O$_4$, as shown in Table 1.

TABLE 1

Performance of Stoichiometric, Nonstoichiometric, and Surface-Coated Li—Mn—O Spinels from the Literature[a]

| composition/description | C-rate (corresponding temperatures) | % capacity retention per cycle | refs |
|---|---|---|---|
| LiMn$_2$O$_4$ | 0.33. 0,2, 0.2 (25, 22, and 25° C.) | 99.85, 99.75, 99.21 | 5, 6, 8 |
| LiMn$_2$O$_4$ | 0.33, 0.2, 0.33 (50, 60, and 50° C.) | 99.62, 99.59, 99.27 | 5, 9, 16 |

TABLE 1-continued

Performance of Stoichiometric, Nonstoichiometric, and Surface-Coated Li—Mn—O Spinels from the Literature[a]

| composition/description | C-rate (corresponding temperatures) | % capacity retention per cycle | refs |
|---|---|---|---|
| $LiMn_2O_4$ | 8, 0.5 (25° C.) | 99.88, 99.5 | 17, 18 |
| $Ag/LiMn_2O_4$ composite | 4 (25° C.) | 99.8 | 19 |
| $Li_{1.05}Mn_{1.95}O_4$ | 0.2, 0.2, 1 (25° C.) | 99.96, 99.81, 99.98 | 7, 8, 20 |
| $Li_{1.05}Mn_{1.05}O_4$ | 0.2. 0.2 (55° C.) | 99.76, 99.85 | 6, 7 |
| $LiAl_{0.2}Mn_{1.8}O_{4-\delta}F_{0.5}$ | 0.2 (55° C.) | 99.94 | 6 |
| $LiCoO_2$-modified $LiMn_2O_4$ | 0.5, 2 (25° C.) | 99.97, 99.96 | 9 |
| ZnO-coated $LiMn_2O_4$ | 0.33 (55° C.) | 99.94 | 11, 12 |

[a]Percent capacities and refs in columns 3 and 4, respectively, correspond to the C-rates given in column 2.

Figure 5A:
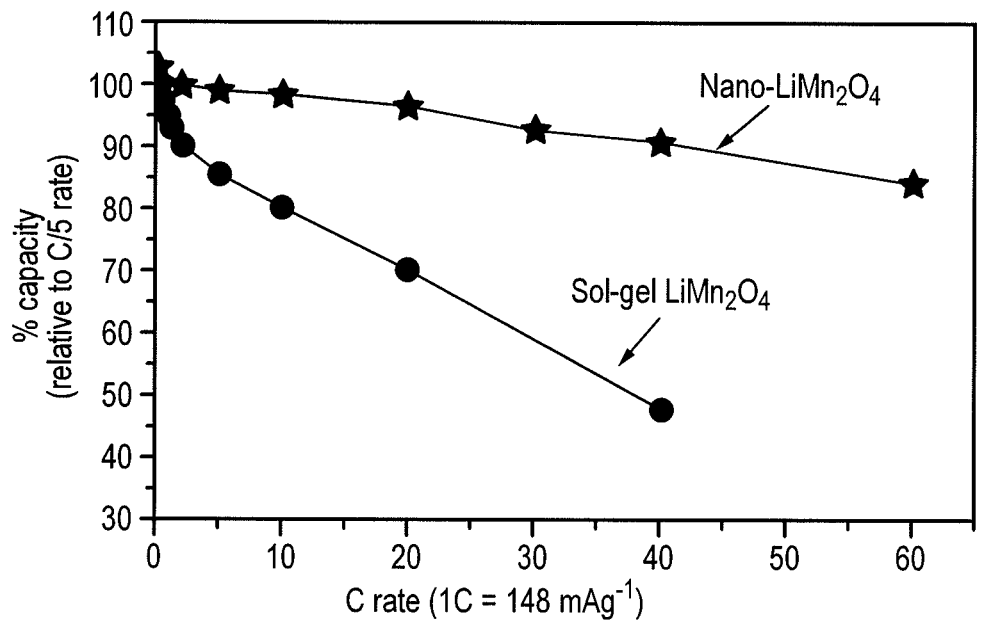
FIG. 5(a) shows rate performance of nano-LiMn$_2$O$_4$ compared with sol-gel LiMn$_2$O$_4$. The rate capability is expressed as the percentage of the capacity obtained at a specific discharge rate compared to that obtained at a low rate of C/5 (30 mA g$^{-1}$; ~0.15 mA cm$^{-2}$)
Figure 5B:
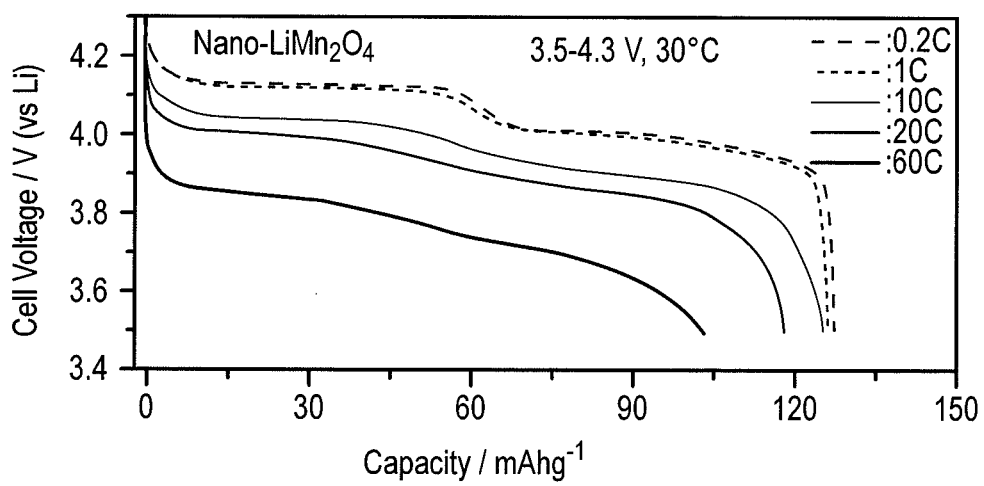
FIG. 5(b) shows the discharge voltage profile for nano-LiMn$_2$O$_4$ at different C-rates.

The rate capability of nano-$LiMn_2O_4$ is presented in FIG. 5. The rate capability is expressed as the capacity at a given discharge rate relative to that obtained at a rate of ~C/5. The rate performance of nano-$LiMn_2O_4$ is excellent, corresponding to 90% retention of capacity at 40 C and 85% at 60 C (8880 mA g$^{-1}$, discharge in 42 s). The performance of nano-$LiMn_2O_4$ exceeds that of sol-gel $LiMn_2O_4$ with the same surface area. The voltage profiles of nano-$LiMn_2O_4$ at different C-rates are shown in FIG. 5b. The rate performance of nano-$LiMn_2O_4$ may be compared with data from the literature, as shown in Table 2, which confirms the good rate capability of nano-$LiMn_2O_4$.

TABLE 2

Rate Performance for Li—Mn—O Spinels (Stoichiometric, Nonstoichiometric, as Well as Surface-Coated) from the Literature[a]

| composition/specification | C-rate | % capacity retention[b] | refs |
|---|---|---|---|
| $LiMn_2O_4$ | 4, 10, 20 | 47, 57, 46 | 8, 18, 21 |
| $Li_{1.05}Mn_{1.95}O_4$ | 4 | 82 | 8 |
| $Li_{1.09}Mn_{1.91}O_4$ | 20 | 80 | 22 |
| $Li_{1.05}Mn_{1.95}O_4$[c] | 15 | 70 | 20 |
| $LiMn_{1.85}Ni_{0.075}Li_{0.075}O_4$ | 10, 20 | 84, 57 | 8 |
| $Li_{1.04}Mg_{0.045}Mn_{1.92}O_4$ | 10 | 83 | 23 |
| 6.3 wt % Ag—$LiMn_2O_4$ composite | 10 | 94 | 19 |
| alumina-coated thin film | 45 | 79 | 24 |
| $LiCoO_2$ (7%)-coated $LiMn_2O_4$ | 20 | 83 | 21 |

[a]The electrode formulation, thickness, active material loading, and cell fabrication used in different laboratories may vary, and hence, comparisons may only be approximate.
[b]Capacity retention compared with capacity at ~C/5 rate.
[c]$Li_{1.05}Mn_{1.95}O_4$ hollow nanospheres.

To explore whether the good rate capability is retained on prolonged cycling, nano-$LiMn_2O_4$ has been cycled at a rate of 10 C (1480 mA g$^{-1}$) for 1000 cycles, as shown in FIG. 4(c). The results show an initial capacity of 120 mA·h g$^{-1}$, retaining 109 mA·h g$^{-1}$ after 1000 cycles. The specific power (based on the active mass of material) is also plotted in FIG. 4(c), and it shows no fade up to 1000 cycles. This is due an almost invariant average voltage of the cell on cycling. It may be noted that, at 20 C, the specific power is >11 000 W kg$^{-1}$ for nearly 2 min, which compares favorably with the value of 8000 W kg$^{-1}$ for about 100 s for $LiMn_2O_4$ prepared by other methods, as reported in Lanz, M.; Kormann, C.; Steininger, H.; Heil, G.; Haas, O.; Novak, P. J. *Electrochem. Soc.* 2000, 147, 3997.

To determine whether the volumetric energy density of nano-$LiMn_2O_4$ is significantly compromised because of the small particle size/porous morphology, we have evaluated the volumetric energy density using the actual volume of the electrode measured directly, following the procedure described in Shaju, K. M.; Bruce, P. G. *AdV. Mater.* 2006, 18, 2330. and Shaju, K. M.; Bruce, P. G. *J. Power Sources* 2007, 174, 1201, both of which are incorporated by reference. The volumetric energy density (based on total electrode volume including conducting carbon and binder) is 785 W·h L$^{-1}$ at 0.1 C, which is similar to that observed for spinel with micrometer-sized particles at comparably low rates. This may be due to the carbon and the binder occupying some of the pore volume thus negating the effect of porosity on the volumetric energy density. On increasing the rate, a volumetric energy density of 750 W·h L$^{-1}$ is retained at 20 C.

The significant capacity fading normally observed for stoichiometric $LiMn_2O_4$ has been attributed to several causes including, $Mn^{3+}$ disproportionation to $Mn^{2+}$ and $Mn^{4+}$, followed by $Mn^{2+}$ dissolution in the electrolyte, the onset of the Jahn-Teller (J-T) distortion near the end of discharge, or the small difference in the lattice parameters between $Mn_2O_4$ and $Li_{0.5}Mn_2O_4$, with dissolution being the most frequently cited cause. Such disproportionation and dissolution is associated with degradation of the $LiMn_2O_4$ spinel structure, on cycling. As dissolution proceeds and the proportion of $Mn^{4+}$ in the remaining spinel increases, $Li_2MnO_3$ is formed, as seen in powder diffraction patters of cycled materials. PXRD data for nano-$LiMn_2O_4$ and sol-gel $LiMn_2O_4$, in the discharged state, after various numbers of charge/discharge cycles, are shown in FIG. 1. Structural degradation of sol-gel $LiMn_2O_4$ is evident in FIG. 1. The additional peaks that appear on cycling are identical to those observed previously for cycled $LiMn_2O_4$ and include the major peaks from $Li_2MnO_3$. These diffraction data are in sharp contrast to those for nano-$LiMn_2O_4$ after cycling under identical conditions, as shown in FIG. 1. The PXRD for nano-$LiMn_2O_4$ demonstrate excellent structural stability on cycling, in good accord with the high degree of capacity retention, as shown in FIG. 4.

The structural stability and good capacity retention for stoichiometric nano-$LiMn_2O_4$ suggest a low level of Mn dissolution in the electrolyte. The manganese solubility in LP30 (1 M $LiPF_6$ in EC/DMC with 1/1 volume ratio) was determined for nano- and sol-gel $LiMn_2O_4$. Equal masses (100 mg) of nano-$LiMn_2O_4$ and sol-gel $LiMn_2O_4$ were immersed in 5 mL of LP30 electrolyte at 30° C., and the manganese content in the solution was determined after 1 and 2 days of exposure. The measured manganese contents after 1 day were 33 (24) and 75 (58) ppm, respectively, for the nano- and sol-gel $LiMn_2O_4$, with the values in the parentheses representing the dissolution normalized per unit area of the material. The respective values after 2 days of exposure to the electrolyte were 37 (27) and 97 (75) ppm. The dissolution at 50° C. was also determined, and the respective manganese contents after 30 days of exposure were 98 (70) and 248 (191) ppm. Evidently, nano-$LiMn_2O_4$ is less soluble than sol-gel $LiMn_2O_4$ at 30 and 50° C.

Figures 6A, 6B:
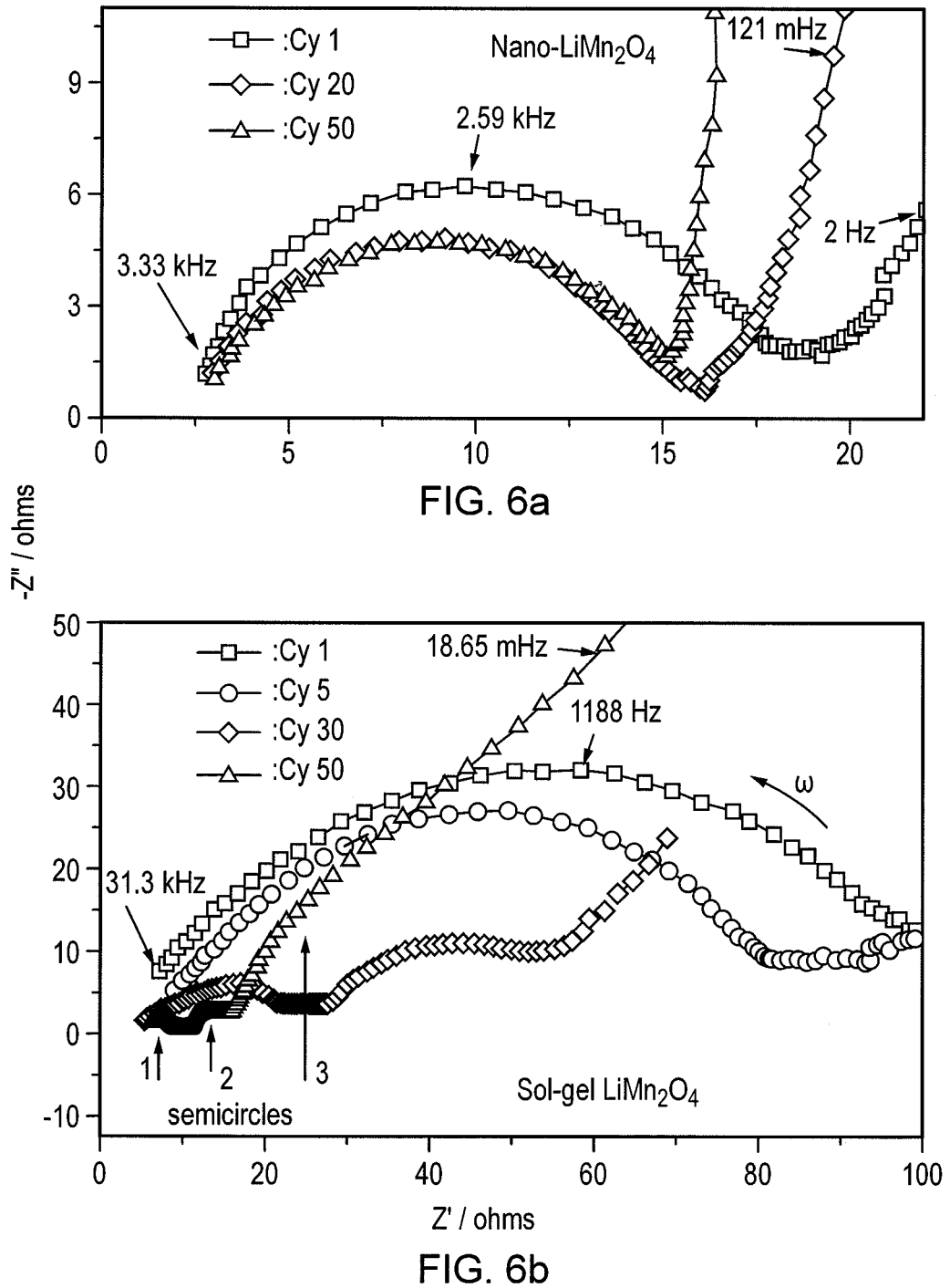
FIG. 6(a) shows complex impedance plots at the end of discharge for nano LiMn$_2$O$_4$ for select cycles.
FIG. 6(b) shows complex impedance plots at the end of discharge for sol-gel LiMn$_2$O$_4$ for select cycles.

Dissolution occurs at the electrode/electrolyte interface. The lower solubility and superior structural stability of nano-$LiMn_2O_4$ signals a more stable interface. Alternating current impedance has been used to study the electrolyte/spinel interface. It is used here to study nano- and sol-gel $LiMn_2O_4$. All data were collected on three-electrode cells and therefore relate only to the response of the spinel electrodes. The ac impedance data after various numbers of cycles are shown in FIG. 6. Comparing the results for nano and sol-gel $LiMn_2O_4$, the ac impedance for the former is lower than the latter and varies much less on cycling. Throughout the cycling range, nano-$LiMn_2O_4$ exhibits a single semicircle, which may be described by a combination of a resistance, capacitance, and constant phase element (CPE). Nonlinear least-squares fitting reveals that this semicircle is associated with a capacitance of ~40 μF cm$^{-2}$. On cycling, the impedance reduces by only a few ohms and the capacitance remains invariant. These results are consistent with a very stable interface. This behavior is in contrast to that observed for sol-gel LiMn$_2$O$_4$, where there are significant changes in the impedance on cycling, with the development of 2-3 semicircles, FIG. 6b. The high-frequency semicircle at cycle 50 is associated with a capacitance of 120 μF cm$^{-2}$. The second (intermediate frequency) semicircle at cycle 50 is associated with a capacitance of approximately 3 mF cm$^{-2}$ and the low-frequency semicircle with ~35 mF cm$^{-2}$. Such high capacitances have been noted before and are indicative of processes directly on the electrode surface. The invariance of ac impedance on cycling nano-LiMn$_2$O$_4$ compared with sol-gel LiMn$_2$O$_4$ is consistent with the superior structural stability and capacity retention of the former.

What then is the origin of the stable cycling, good rate capability, excellent structural stability, and invariant ac impedance of nano-LiMn$_2$O$_4$, when stoichiometric LiMn$_2$O$_4$, in general, whether composed of micrometer or nanometer particles, does not exhibit such behavior? Without wishing to be bound by any particular theory, it may be related to differences in the formation of the SEI layer that is expected to form on the surface of LiMn$_2$O$_4$ when in contact with the electrolyte. Given the results discussed above, especially, the similarity in capacity retention of nano-LiMn$_2$O$_4$ and surface-coated stoichiometric spinels, as shown in Table 1, it is possible that the nano-LiMn$_2$O$_4$ particles become coated with a protective layer during synthesis. However, high-resolution TEM failed to provide any clear evidence of a surface layer on as prepared nano-LiMn$_2$O$_4$ particles, as shown in FIG. 2, and the CHN analysis supported the absence of any residual carbon from pyrolysis of the organics in air, as expected. The surface/near-surface region appears very similar to other uncoated particles, e.g., sol-gel LiMn$_2$O$_4$, as shown in FIG. 2. If a separate surface layer exists, it must be very thin. X-ray photoelectron spectroscopy (XPS) studies also failed to identify the presence of a foreign surface on the nano-LiMn$_2$O$_4$ particles. However, more detailed studies, including XPS with depth profiling, are underway to investigate the surface further, especially whether the synthesis conditions modify the surface composition or surface structure of spinel in a fashion that could account for the enhanced stability.

In conclusion, stoichiometric LiMn$_2$O$_4$ spinel has been synthesized with a morphology composed of nanoparticles (50-100 nm) fused to form a porous structure, which is retained on electrode fabrication and cycling. The material exhibits a high initial capacity (131 mA·h g$^{-1}$) and retains 118 mA~h g$^{-1}$ after 200 cycles, at a discharge rate of C/2. It also exhibits excellent rate capability, retaining 90% of its capacity at 40 C and 85% at 60 C. Cycling at a rate of 10 C is associated with nearly 100% power retention (5840 W kg$^{-1}$ (of LiMn$_2$O$_4$) dropping to 5828 W kg$^{-1}$ after 1000 cycles). Volumetric energy density, at 10 C, based on the total volume of the composite electrode, is ~750 W-11 L$^{-1}$. Capacity retention is superior to stoichiometric LiMn$_2$O$_4$ with a similar surface area. Differences in the capacity retention on cycling are reflected in superior structural stability, lower Mn dissolution, and relatively invariant ac impedance of nano-LiMn$_2$O$_4$ compared with sol-gel LiMn$_2$O$_4$, results that suggest nano-LiMn$_2$O$_4$ particles may possess a stabilized surface that inhibits dissolution.

Nano-Li[Ni$_{0.5}$Mn$_{1.5}$]O$_4$ Spinel

Disordered and ordered forms of nano-Li[Ni$_{0.5}$Mn$_{1.5}$]O$_4$ spinel, have been prepared by a one-pot resorcinol-formaldehyde synthesis. Lithium intercalation into disordered nano-Li[Ni$_{0.5}$Mn$_{1.5}$]O$_{4-\delta}$ reveals good rate capability and cycling stability. It delivers 95.5% of the capacity at a rate of 10 C (1500 mA g$^{-1}$) and 88% at 20 C (3000 mA g$^{-1}$) compared with the capacity at low rate (0.2 C). A capacity retention on cycling of 99.97% per cycle at 1 C rate has also been observed. The superior electrochemical behavior of disordered nano-Li[Ni$_{0.5}$Mn$_{1.5}$]O$_{4-\delta}$ has been correlated with AC impedance data, which suggests a modified surface for the nanomaterial prepared using the resorcinol-formaldehyde route compared with micron sized materials prepared by conventional solid state synthesis.

The synthesis of nanostructured Li[Ni$_{0.5}$Mn$_{1.5}$]O$_4$ spinel using a resorcinol-formaldehyde route is described. One of the resulting materials, the disordered phase, combines high power and good cycling stability, delivering 88% of the capacity at a rate of 20 C (3000 mA g$^{-1}$) compared with the low rate (0.2 C) capacity and 99.97% capacity retention per cycle when cycled at the 1 C rate.

The synthesis of nano-Li[Ni$_{0.5}$Mn$_{1.5}$]O$_4$ was carried out by a resorcinol-formaldehyde assisted solution method. Stoichiometric amounts of LiCH$_3$COO.2H$_2$O, Ni(CH$_3$COO)$_2$.4H$_2$O and Mn(CH$_3$COO)$_2$.4H$_2$O (Fluka, ≧99%) were dissolved in quantities corresponding to 0.02 moles of Li[Ni$_{0.5}$Mn$_{1.5}$]O$_4$ per 100 ml of water containing 0.1 moles of resorcinol (Fluka, 99%) and 0.15 moles of formaldehyde (Fluka, 36.5% in water, methanol stabilized). The resultant mixture was then heated until viscous. The heating step may occur at a temperature of between about 40-80° C., and more preferably at a temperature of about 60° C. The time until the resultant mixture is sufficiently viscous may be about 10-120 minutes, and more typically about 30-60 minutes, depending on the temperature; gelation occurs sooner at higher temperatures. The heated mixture was deemed to be sufficiently viscous when it changed from a pale colored liquid to a brown colored gel. The gelled/solidified product could optionally be left to cool and further solidify before further heating. The gelled/solidified product was heated again at an increased temperature, e.g., about 80-100° C., preferably about 90° C., for 12-36 hrs, preferably for about 24 hrs. Optionally, the solid product was further heated at an even higher temperature, e.g., about 150-250° C., preferably about 200° C. for an additional 1-4 hrs, preferably for about 2 hrs. The solid product was then ground and calcinated at between about 500-900° C., preferably about 700-800° C. for 8-24 hrs, preferably about 12-15 hrs, to obtain nano-Li[Ni$_{0.5}$Mn$_{1.5}$]O$_4$. All procedures were carried out in air.

Working Example of a One-Pot Synthesis Method is as Follows:

Resorcinol (0.1 mol) and formaldehyde (0.15 mol) were dissolved in water (10 ml). Lithium acetate dihydrate (0.02 mol), nickel (II) acetate tetrahydrate (0.01 mol) and manganese (II) acetate dihydrate (0.03 mol) were dissolved in a quantity of water (~50 ml), and added to the resorcinol-formaldehyde solution. The solution then underwent heating at 60° C. until a thick, brown viscous gel was formed. The slurry was heated at 90° C. for 24 hrs, 200° C. for 2 hrs, and the resulting solid product ground and placed in a crucible. This was then heated at 750° C. (for disordered) or 700° C. (for ordered) for 12-15 hrs, resulting in the formation of the desired Li(Ni$_{0.5}$Mn$_{1.5}$)O$_4$.

The gelling process is a simple matter of heating the resorcinol-formaldehyde mixture to over 60° C. until the gelation process is initiated—easily determined as there is a noticeable change from pale-colored solution to cream-brown viscous gel. This process normally takes 30 to 60 minutes, depending on the chemical formula of the intended product. Advantageously, the beaker is removed from the stirrer-hot plate as soon as gelation has been initiated. The resulting product may then be left to cool and solidify, e.g. for about 2 hrs.

A conventional high temperature $Li[Ni_{0.5}Mn_{1.5}]O_4$ powder was prepared by the mixed hydroxide route, following a previously published procedure described in K. Ariyoshi, Y. Iwakoshi, N. Nakayama and T. Ohzuku, *J. Electrochem. Soc.,* 2004, 151, A296.

Structural analysis was carried out by powder X-ray diffraction (PXRD) using a Stoe STADI/P diffractometer operating in transmission mode with a Fe source. Rietveld refinement of the PXRD data, using FullProf, was employed to obtain the lattice parameters. Chemical analysis was carried out by ICPAES at the CNRS facility in Vernaison (France). The carbon content was determined by CHN analysis (CE Instrument, EA 1110 CHNS). Scanning electron microscopy (SEM, JEOL JSM-5600) and transmission electron microscopy (TEM, Jeol JEM-2011) were employed to study the morphology. Surface area measurements were obtained using the Brunauer, Emmett, and Teller (BET) method using a Micromeritics Gemini 23670 instrument.

To evaluate the electrochemical performance, composite electrodes were fabricated with the active material, Kynar 2801 (a copolymer based on PVDF) and super S carbon, in the weight ratios 76:12:12. Coin cells (NRC 2325) were assembled employing the composite electrode with lithium metal as the counter/reference electrode and LP 30 (Merck, 1 M LiPF6 in 1:1 v/v EC: DMC) as the electrolyte. More details of this procedure may be found in K. M. Shaju and P. G. Bruce, *Adv. Mater.,* 2006, 18, 2330 and K. M. Shaju and P. G. Bruce, *J. Power Sources,* 2007, 174, 1201, both of which are incorporated by reference. Electrochemical measurements at 30 and 50±1° C. were carried out using a Maccor Series 4200 battery cycler. A 3-electrode cell with lithium metal as the counter and reference electrodes and LP30 as the electrolyte was used for AC impedance measurements. Data were collected using a Solartron 1255 frequency response analyser coupled with a Solartron 1286 electrochemical interface. A perturbation voltage of 5 mV and a frequency range from 50 kHz to 10 mHz were employed.

$Li[Ni_{0.5}Mn_{1.5}]O_4$ adopts the spinel structure and can be ordered or disordered. In both cases the oxide ion sub-array is cubic close packed but in the latter, the Ni and Mn ions are disordered over the octahedral B-sites and the space group is Fd$\bar{3}$m, whereas in the former case the Ni and Mn ions are ordered on the B-sites such that the space group is $P4_332$. The disordered phase is believed to be accompanied by a small amount of oxygen deficiency.

Figure 7A:
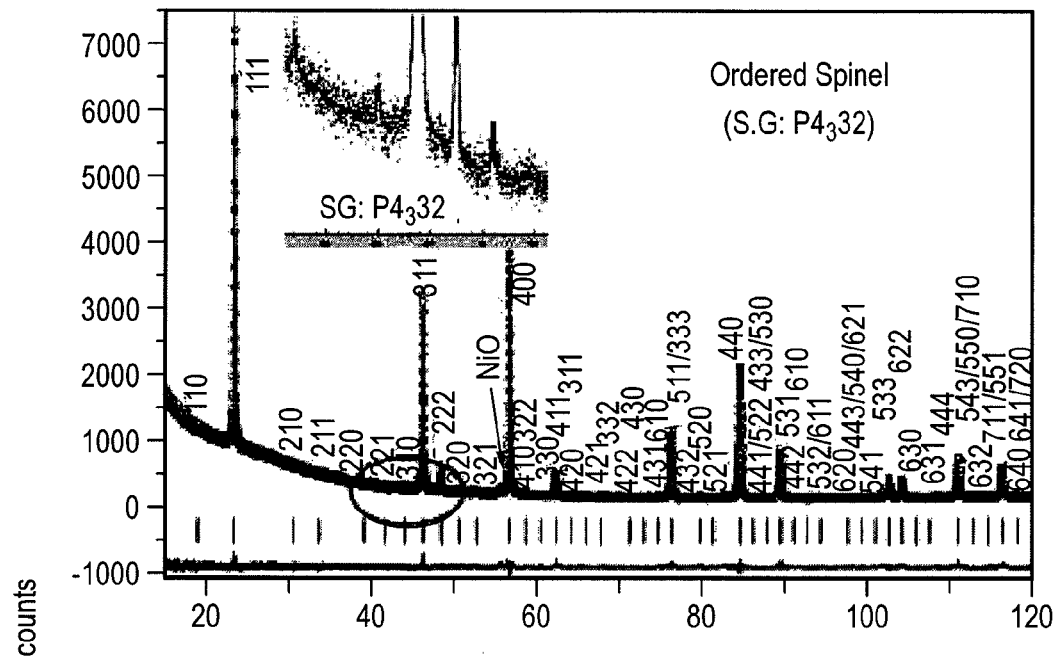
FIG. 7(a) is a comparison of the experimental (●) and calculated (–) powder X-ray diffraction patterns for ordered Li[Ni$_{0.5}$Mn$_{1.5}$]O$_4$ spinel, vertical lines indicate peak positions and the difference plot is also shown. The inset shows the expanded region (circled) highlighting peaks due to the Ni/Mn ordering, the most intense NiO impurity peak is indicated by an arrow.
Figure 7B:
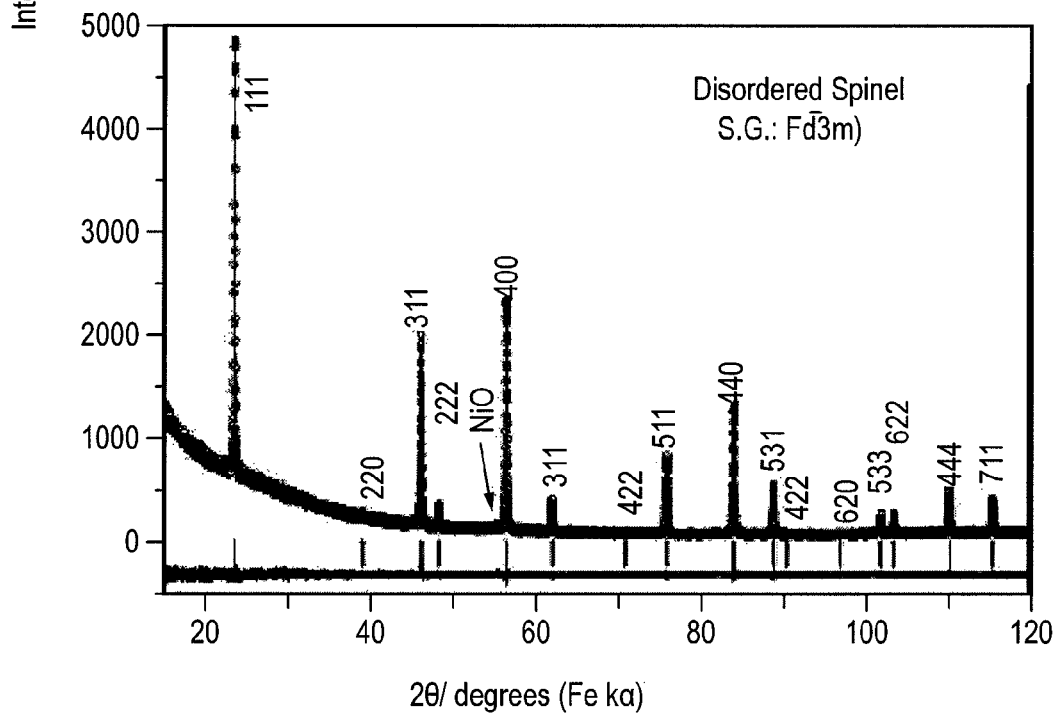
FIG. 7(b) is a comparison of the experimental (●) and calculated (–) powder X-ray diffraction patterns for disordered Li[Ni$_{0.5}$Mn$_{1.5}$]O$_{4-\delta}$ spinel, vertical lines indicate peak positions and the difference plot is also shown.

The ordered and disordered forms of the lithium nickel manganese oxide spinel were synthesized by calcinations at 700 and 750° C. for 15 h in air, respectively, using the resorcinol-formaldehyde route described in the experimental section. The powder X-ray diffraction data for each are shown in FIG. 7. The diffraction patterns and lattice parameters for the ordered $LiNi_{0.5}Mn_{1.5}O_{4-\delta}$, $a_0$=8.1677 Å and the disordered $Li[Ni_{0.5}Mn_{1.5}]O_{4-\delta}$, $a_0$=8.1733 Å are in excellent agreement with those reported previously in the literature for materials prepared using a solid state reaction. In the ordered material the oxidation states are $Ni^{2+}$ and $Mn^{4+}$, whereas the small amount of oxygen loss for disordered spinel is compensated for by the formation of $Mn^{3+}$. As a result of the larger size of the $Mn^{3+}$ ion, the cubic lattice parameter is greater in the case of the disordered material. Because the X-ray scattering factors of Ni and Mn are similar, the super lattice peaks associated with the Ni/Mn ordering are weak, as shown in FIG. 7 (inset). Further confirmation that the ordered and disordered forms of the spinel have been prepared successfully are given later when the electrochemistry is discussed. It may also be noted that a very small amount of NiO is visible in the powder X-ray diffraction patterns for both phases in FIG. 7, something that is commonly observed in the synthesis of such materials.

Chemical analysis confirmed that the cation contents arising from the synthesis of the ordered and disordered spinels are the same and oxidation state analysis confirmed the presence of a small amount of $Mn^{3+}$ in the disordered phase.

The TEM data shown in FIG. 8 demonstrates that the synthesis method used has resulted in a material composed of nanometer-sized particles. SEM images of the as-prepared disordered material and of the electrode after charge-discharge cycling (50 cycles, 150 mAg$^{-1}$), FIGS. 8(c and d) show that the nanometer-sized particles are fused together such that they generate micron-sized pores between the particles and confirms that the morphology is retained after electrode fabrication and cycling in the electrochemical cells. The morphologies are the same for ordered and disordered lithium nickel manganese oxide spinels. The materials possess surface areas of ~15 $M^2g^{-1}$ for both ordered $Li[Ni_{0.5}Mn_{1.5}]O_4$ and disordered $Li[Ni_{0.5}Mn_{1.5}]O_{4-\delta}$, as determined by the BET method.

Figure 9A:
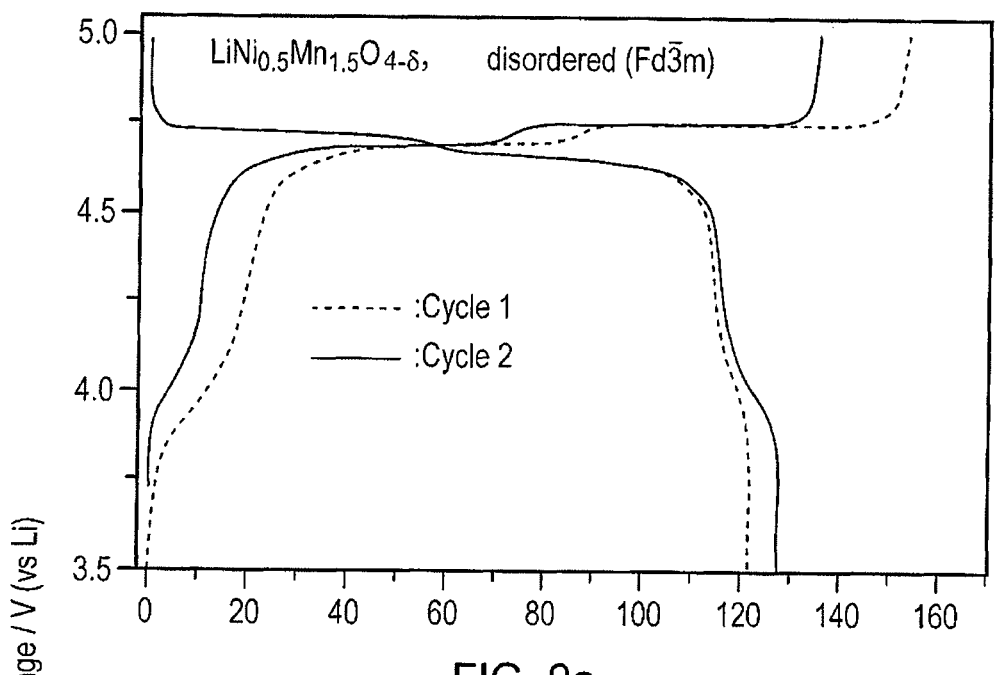
FIG. 9 shows charge and discharge voltage profiles for the first and second cycles at 30° C. and 75 mA g$^{-1}$ between 3.5-5.0 V, for (a) the disordered phase and for (b) the ordered phase.
Figure 9B:
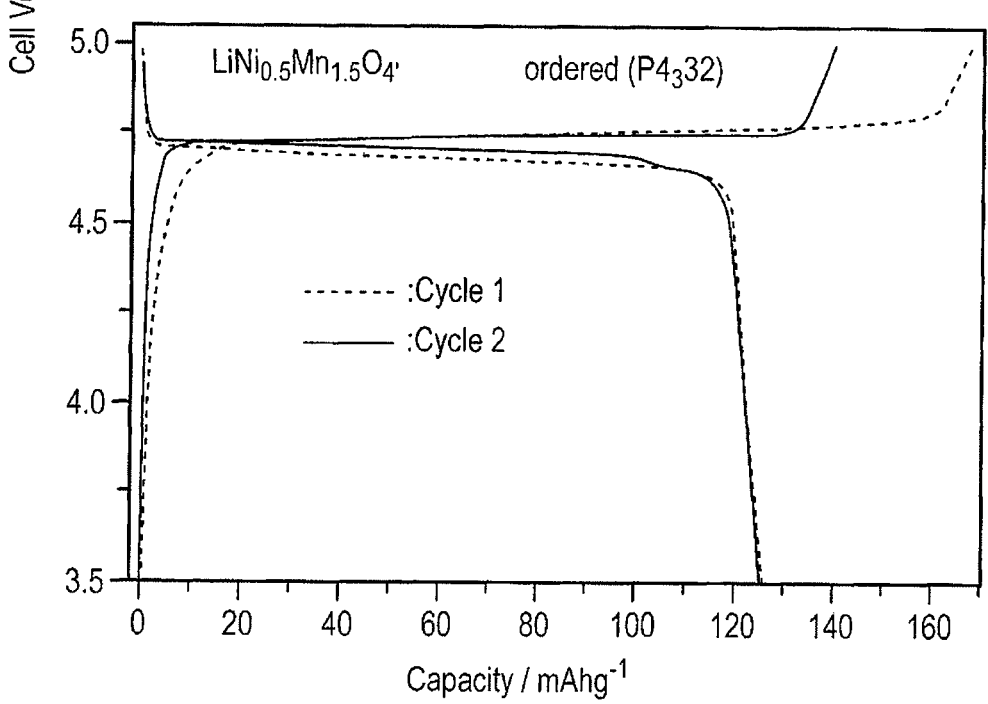

To examine the influence of the nanomorphology on the electrochemistry, each material was fabricated into a composite electrode and located within the lithium cell as described in the Experimental. Electrode fabrication and cell assembly were identical for both ordered and disordered materials. Charge-discharge curves collected at low rate are presented in FIG. 9, for both materials. The curves are in accord with those presented previously for such materials. They exhibit overcharge, especially on the first cycle, which has been attributed to electrolyte oxidation. The cycling capacity occurs around 4.7 V and exhibits a step at ~50% state of charge, which is more prominent in the case of the disordered material, as observed previously. Such differences confirm the identification of the two materials as the ordered and disordered forms of the spinel. The presence of a small step at around 4 V in the disordered material is associated with the $Mn^{3+/4+}$ redox couple. The 4.7 V process arises from the $Ni^{2+/4+}$ redox couple.

Figure 10A:
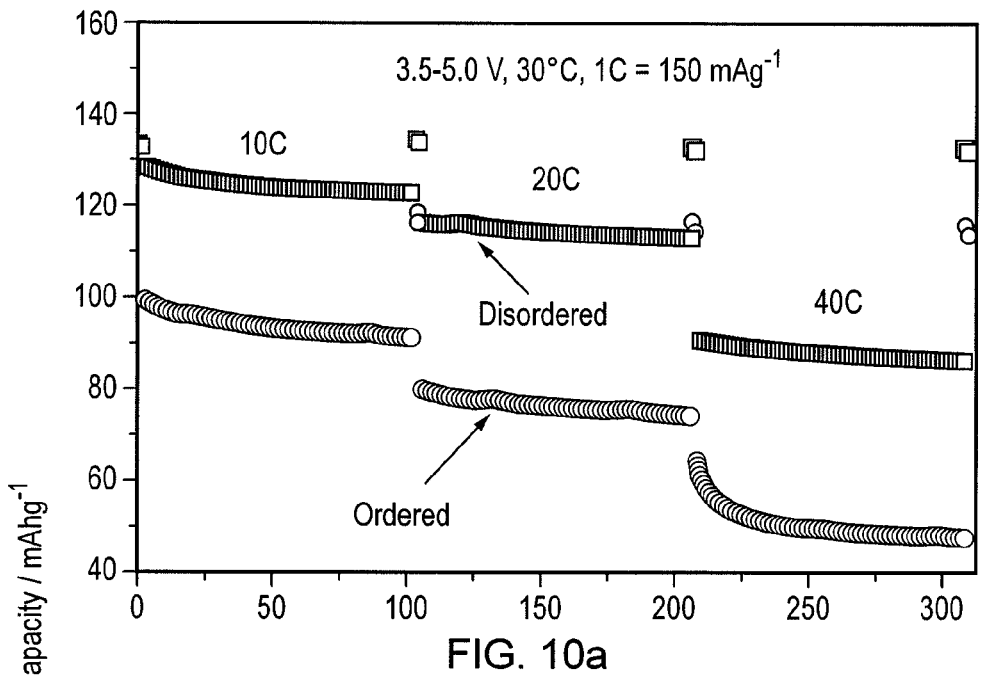
FIG. 10 shows cycling performance for nano-Li [Ni$_{0.5}$Mn$_{1.5}$]O$_4$ (ordered and disordered phases). (a) High rate cycling at 30° C. The cycling protocol was, charge and discharge at 30 mA g$^{-1}$ for the first two cycles, then the cycling was continued at the discharge rate shown and at a charge rate of 4 C (600 mA g$^{-1}$). After 100 cycles at the specified rate, the cells were subjected to cycling at 30 mA g$^{-1}$ for two cycles. (b) Cycling performance at 30 and 50° C. at a 1 C charge and discharge rate.

Since the current interest in lithium nickel manganese oxide spinel is primarily for high power applications, the rate of lithium intercalation-deintercalation is especially important. The capacity as a function of cycle number at different rates is shown in FIG. 10. The superior rate capability of the disordered material, which has been attributed to its greater electronic conductivity associated with the Ni/Mn disordering and presence of $Mn^{3+/4+}$, is evident in FIG. 10.[9*,15*,35*] Significantly, our nanostructured disordered material exhibits an initial capacity of at least about 129 mA h g$^{-1}$ at 10 C (1 C rate=150 mA g$^{-1}$) and at least about 118 mA h g$^{-1}$ at 20 C. This corresponds respectively to 95.5 and 88% of its capacity at 0.2 C (135 mAh g$^{-1}$), demonstrating excellent rate performance. This rate performance compares favourably with literature reports for disordered lithium nickel manganese oxide spinel. Where, for example, capacity retentions of 92% at 10 C and 87% at 19 C;[9*] 82% at 6 C;[34*] 96% at 8 C;[35*] 82% at 4 C;[36*] 68% at 5 C[37*] and 95% at 3.5 C[38*] compared with the capacity at ~0.2 C, have been observed. At the end of each series of cycles in FIG. 10(a), two cycles were completed at a low rate of C/5 and this shows that the reduction of capacity at higher rates is completely reversible. The capacity retention after 300 cycles is 99%, the best performance reported previously exhibits a retention of 97.7% after 245 cycles at 19 C for LiNi$_{0.49}$Mn$_{1.51}$O$_4$.[9*] Further, on continuous cycling at high rate, the best capacity retention reported for nano-Li[Ni$_{0.5}$Mn$_{1.5}$]O$_{4-\delta}$ (BET area=15.5 m$^2$ g$^{-1}$) is 73% after 100 cycles when cycled at 15 C,[26*] whereas the disordered nano-Li[Ni$_{0.5}$Mn$_{1.5}$]O$_{4-\delta}$ reported here when cycled continuously at 20 C (3000 mA g$^{-1}$, cycles 104-204 in FIG. 10(a)) retains 97.5% after 100 cycles.

Figure 10B:
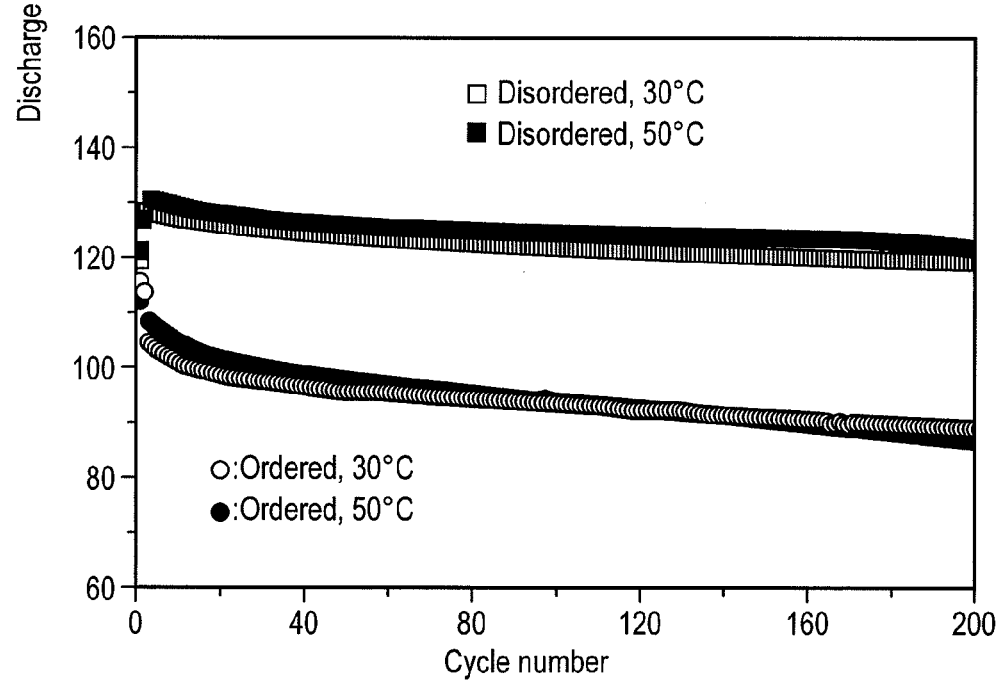

Having established good capacity and cycling stability at high rates ($\geq$10 C) for the nanomaterials synthesized using resorcinol-formaldehyde, it is important to consider the capacity retention on extended cycling at lower rates, especially since electrodes based on nanomaterials might be expected to exhibit capacity fade at low rate due to their high surface area.[24*,26*] The variation of capacity with cycle number for ordered and disordered materials at 30 and 50° C., are shown in FIG. 10(b). The disordered material at 30° C. exhibits an initial capacity of 128 mA h g$^{-1}$ retaining a capacity of 120 mA h g$^{-1}$ after 200 cycles (corresponding to a capacity retention of 99.97% per cycle). Li[Ni$_{0.5}$Mn$_{1.5}$]O$_4$ reported in the literature and synthesized by different methods has been shown to exhibit cycling stabilities of: 99.89% at ~2 C,[10*] 99.89% at 0.33 C,[15*] 99.81% when cycled at 1 C rate,[25*] 99.73% at 2 C rate,[26*] 99.96% at the C/5 rate[28*] and 99.83% at the C/5 rate.[36*] Once again the inferior performance of the ordered Li[Ni$_{0.5}$Mn$_{1.5}$]O$_4$ is apparent, with capacity retention of only 99.92% per cycle, FIG. 10(b). Despite the high potential of the lithium nickel manganese oxide spinels the disordered material exhibits excellent capacity retention at 50° C., (capacity retention 99.96% per cycle), which is almost identical to the value at 30° C., whereas the ordered material retains only 99.90% per cycle.

The good rate capability of disordered nano-Li[Ni$_{0.5}$Mn$_{1.5}$]O$_{4-\delta}$ synthesized by the resorcinol-formaldehyde route may be attributed to its high surface area/small particle size. However, the combination of such high rate capability with good capacity retention on cycling, when the latter is usually compromised by a high surface area, requires further consideration. No differences could be observed in the bulk structure (PXRD patterns), composition or purity between the materials prepared here and those reported previously, suggesting that the origin of the favourable capacity retention of our nano-Li[Ni$_{0.5}$Mn$_{1.5}$]O$_{4-\delta}$ is likely to lie at the electrode/electrolyte interface.

To investigate this interface in more detail, AC impedance data were collected using 3-electrode cells (see above) as a function of cycling and at the end of charge and discharge for disordered nano-Li[Ni$_{0.5}$Mn$_{1.5}$]O$_{4-\delta}$ and the equivalent material, composed of micron-sized particles, synthesized by conventional solid state reaction. All electrodes and cells were prepared identically. The AC impedance data are shown in FIG. 11. Attention is focused on data at higher cycle numbers since it is the capacity retention on extended cycling that is of primary interest.

Figure 11A:
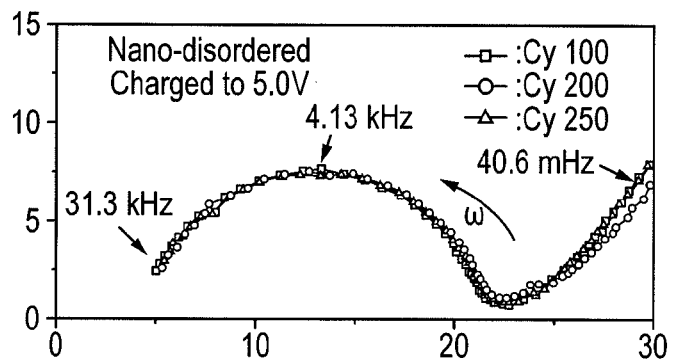
FIG. 11 shows complex impedance plots for nano-Li [Ni$_{0.5}$Mn$_{1.5}$]O$_{4-\delta}$ (disordered phase) (a) charged state, (b) discharged and for normal Li[Ni$_{0.5}$Mn$_{1.5}$]O$_{4-\delta}$ (micron size particles) (c) charged state and (d) discharged state. Plots for select cycles.
Figure 11B:
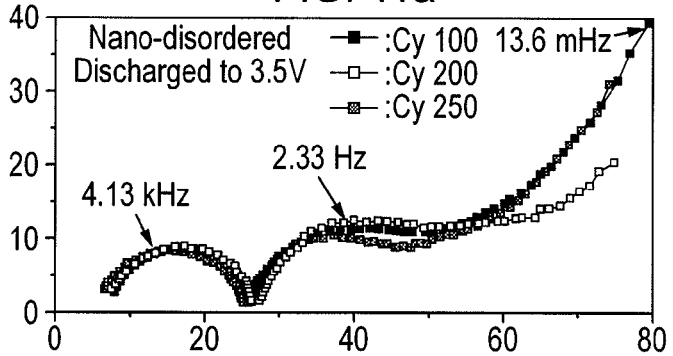
Figure 11C:
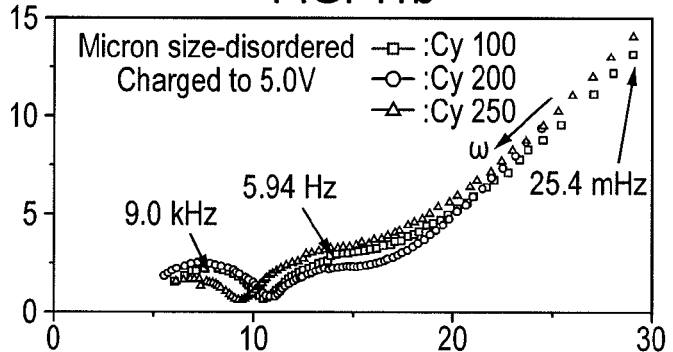
Figure 11D:
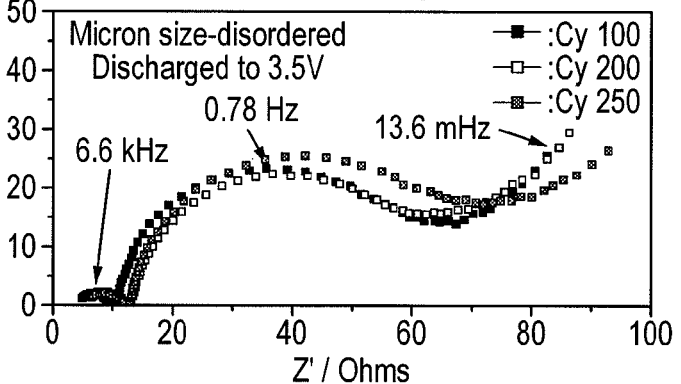

In most cases, FIG. 11(b), FIG. 11(c) and FIG. 11(d), two semicircles are evident. The high and low frequency semicircles are usually assigned to a solid electrolyte interface (SEI) layer and to electrochemical processes directly at the electrode surface, respectively.[25*,26*,39*-41*] In one case, as shown in FIG. 7(a), only the high frequency semicircle is seen. These assignments of the high and low frequency semicircles are reinforced by the fact that the high frequency semicircle is relatively invariant with potential (similar magnitude in charged and discharged states, compare FIGS. 11(a) and (b)), whereas the magnitude of the low frequency semicircle changes significantly with potential. In the case of the nanomaterial, the change in magnitude of the low frequency semicircle is such that it is too small to be seen at 5 V, only the high frequency semicircle remains.

The surface area of the material prepared by solid state reaction is 2.8 m2 g$^{-1}$, whereas the surface area of nano-Li[Ni$_{0.5}$Mn$_{1.5}$]O$_{4-\delta}$ is 15 m$^2$ g$^{-1}$. The larger surface area of the latter would lead us to anticipate a resistance for the nanomaterial 5.4 times smaller than the bulk material, yet this is not the case. The resistance associated with the high frequency semicircles is 17Ω for the nm and 6Ω for the μm sized materials, respectively (based on the diameter of the high frequency semicircles). Such a result in which the order of the resistance is opposite to those expected based on the relative surface areas, suggest that the surface of the disordered nano-Li[Ni$_{0.5}$Mn$_{1.5}$]O$_{4-\delta}$ is different from the material prepared by solid state synthesis.

Figure 8A:
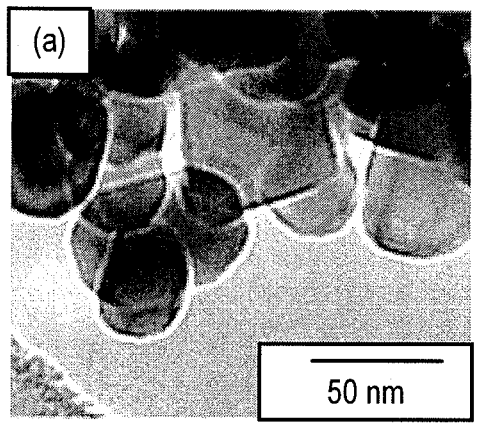
FIG. 8(a) is a TEM image of the as-prepared disordered nano-Li[Ni$_{0.5}$Mn$_{1.5}$]O$_{4-\delta}$.
Figure 8B:
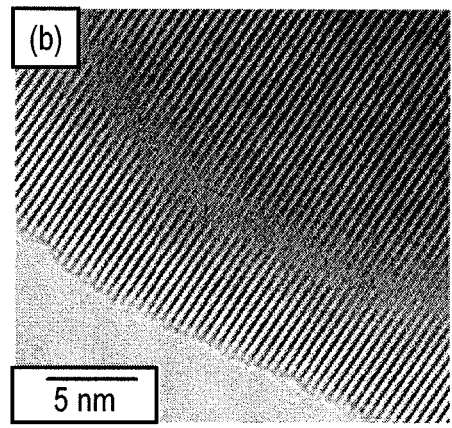
FIG. 8(b) is a high resolution TEM of the as-prepared disordered nano-Li [Ni$_{0.5}$Mn$_{1.5}$]O$_{4-\delta}$.
Figure 8C:
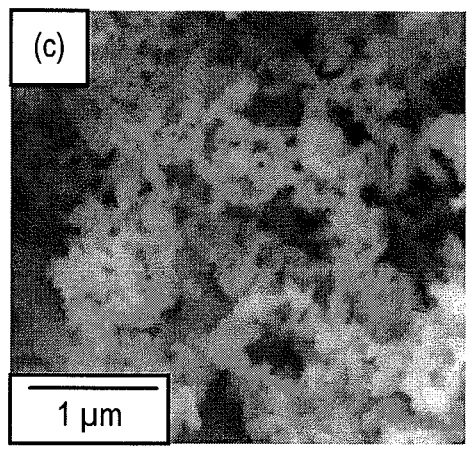
FIG. 8(c) is a SEM image of the as-prepared disordered nano-Li [Ni$_{0.5}$Mn$_{1.5}$]O$_{4-\delta}$.
Figure 8D:
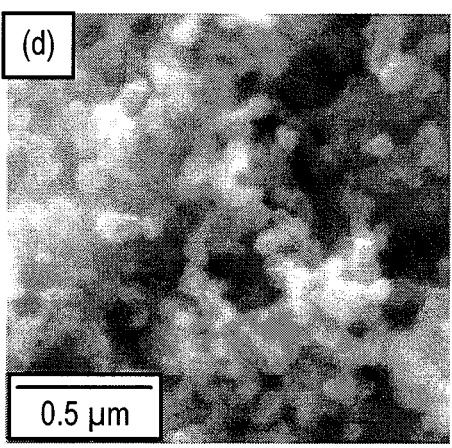
FIG. 8(d) is a SEM image of the disordered nano-Li [Ni$_{0.5}$Mn$_{1.5}$]O$_{4-\delta}$ electrode after 50 cycles between 3.5-5.0 V at 150 mA g$^{-1}$.

The surfaces of disordered nano-Li[Ni$_{0.5}$Mn$_{1.5}$]O$_{4-\delta}$ synthesized by the resorcinol-formaldehyde route is different from the disordered material formed by solid state synthesis with μm sized particles. The HRTEM results in FIG. 8(b) show no clear evidence of a surface layer on the nanomaterial, and if it exists, it must be very thin. The synthesis of disordered nano-Li[Ni$_{0.5}$Mn$_{1.5}$]O$_{4-\delta}$ involves the decomposition of organics upon heating in air. CHN analysis supported the absence of any residual carbon from pyrolysis, as expected. However, as the organics are oxidized, they may modify the surface composition or the structure of the spinel particles. Hence, the surface of the nm particles could differ from the μm sized particles. Attempts to identify any difference between the surface compositions of the disordered nano-Li[Ni$_{0.5}$Mn$_{1.5}$]O$_{4-\delta}$ and the material prepared by solid state synthesis using XPS has not as yet proved conclusive.

Disordered and ordered forms of Li[Ni$_{0.5}$Mn$_{1.5}$]O$_4$, have been prepared by a one-pot resorcinol-formaldehyde synthesis. The resulting materials are composed of nanometer-dimension particles fused together to form a porous morphology, which is retained on electrode fabrication and cycling. Disordered nano-Li[Ni$_{0.5}$Mn$_{1.5}$]O$_{4-\delta}$, exhibits good rate capability corresponding to retention of 88% of the capacity at 20 C (3000 mA h g$^{-1}$) compared with the capacity at a low rate (C/5) and with a capacity retention on cycling of 99.97% per cycle at 1 C rate. Such cycling stability, despite the relatively high surface area of 15 m$^{-2}$ g$^{-1}$, is not reflected in any difference in the bulk structure, composition or purity of these materials compared with those prepared previously, but does correlate with a difference in the AC impedance data between μm and nm materials. The data suggest that the disordered nano-Li[Ni$_{0.5}$Mn$_{1.5}$]O$_{4-\delta}$ possesses a different surface compared with the μm material.

Although the foregoing invention has been described in terms of certain embodiments and examples, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present invention is not intended to be limited by the example or preferred embodiments. The accompanying claims provide exemplary claims and their equivalents are intended to cover forms or modifications as would fall within the scope and spirit of the inventions.

What is claimed is:

1. A method for producing a material comprising nano-Li[Ni$_{0.5}$Mn$_{1.5}$]O$_{4-\delta}$, wherein $4 > \delta \geq 0$, the method comprising dissolving lithium, nickel and manganese salts in an aqueous solution of resorcinol and formaldehyde; and heating the resultant mixture.

2. The method of claim 1, wherein $4 > \delta > 0$.

3. The method of claim 1, wherein the amounts of lithium, nickel and manganese salts dissolved in the aqueous solution correspond to the stoichiometry of Li[Ni$_{0.5}$Mn$_{1.5}$]O$_{4-\delta}$.

4. The method of claim 3, wherein the resultant mixture has a molar ratio of Li[Ni$_{0.5}$Mn$_{1.5}$]O$_{4-\delta}$: resorcinol: formaldehyde of about 0.02:0.1:0.15.

5. The method of claim 1, wherein the lithium, nickel and manganese salts are dissolved in quantities corresponding to about 0.02 mols of the desired stoichiometry of Li[Ni$_{0.5}$Mn$_{1.5}$]O$_{4-\delta}$ per 100 mL of water containing about 0.1 mol of resorcinol and about 0.15 mol of formaldehyde.

6. The method of claim 1, wherein heating the resultant mixture comprises at least two stages of heating, wherein the temperature increases in each stage of heating relative to the previous stage.

7. The method of claim 1, wherein heating the resultant mixture comprises a first stage of heating until the resultant mixture gells and a second stage of heating until the gelled mixture solidifies.

8. The method of claim 7, wherein the first stage of heating occurs at about 60° C. for about 30-60 minutes and a second stage of heating occurs at about 90° C. for about 24 hrs.

9. The method of claim 7, further comprising the steps of grinding the solidified mixture; and then calcinating the ground mixture in air at a temperature of about 700-800° C. for about 12-15 hrs.

10. The method of claim 9, wherein calcinating the ground mixture at a temperature of about 700° C. results in an ordered lithium nickel manganese oxide spinel structure.

11. The method of claim 9, wherein calcinating the ground mixture at a temperature of about 750° C. results in an disordered lithium nickel manganese oxide spinel structure.

12. A disordered lithium nickel manganese oxide material, obtainable by the method of claim 11, wherein said material exhibits an initial capacity of at least about 129 mA h g$^{-1}$ at 10 C and at least about 118 mA h g$^{-1}$ at 20 C.

13. A material comprising Li[Ni$_{0.5}$Mn$_{1.5}$]O$_{4-\delta}$, wherein $4 > \delta \geq 0$, said material comprising nanoparticles fused together to form a porous morphology, wherein the average particle size is about 1-100 nm, and wherein the average pore size is about 1-10 μm.

14. A cathode comprising a material of claim 12 or 13.

15. A lithium ion battery comprising the cathode of claim 14.

* * * * *

UNITED STATES PATENT AND TRADEMARK OFFICE
CERTIFICATE OF CORRECTION

PATENT NO. : 8,431,108 B2  
APPLICATION NO. : 12/857431  
DATED : April 30, 2013  
INVENTOR(S) : Bruce et al.

Page 1 of 1

It is certified that error appears in the above-identified patent and that said Letters Patent is hereby corrected as shown below:

Title page, item 56 at lines 8-9, Under Other Publications, change "Rechrageable" to --Rechargeable--.

Title page, Abstract, item 57 at line 4, change "$\delta \geq O$," to --$\delta \geq 0$,--.

In the Specification:

In column 1 at line 21, Change "$\delta \geq O$." to --$\delta \geq 0$.--.

In column 1 at line 23, Change "$\delta \geq O$," to --$\delta \geq 0$,--.

In column 1 at line 62, Change "deintercaltion" to --deintercalation--.

In column 5 at line 7, Change "gells" to --gels--.

In column 5 at line 60, Change "LiMn2O$_4$;" to --LiMn$_2$O$_4$;--.

In column 8 at line 33, Change "mA·g$^{-1}$" to --mA·hg$^{-1}$--.

In column 9 (Table 1) at line 12 (approx.), Change "Li$_{1.05}$Mn$_{1.05}$O$_4$" to --Li$_{1.05}$Mn$_{1.95}$O$_4$--.

In column 11 at line 54, Change "mA~h g$^{-1}$" to --mA·h g$^{-1}$--.

In column 13 at line 59, Change "LiNi$_{0.5}$Mn$_{1.5}$O$_{4-\delta}$," to --Li[Ni$_{0.5}$Mn$_{1.5}$]O$_{4-\delta}$,--.

In the Claims:

In column 17 at line 25, Claim 7, change "gells" to --gels--.

Signed and Sealed this  
Third Day of June, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,431,108 B2  
APPLICATION NO. : 12/857431  
DATED : April 30, 2013  
INVENTOR(S) : Bruce et al.

Page 1 of 1

It is certified that error appears in the above-identified patent and that said Letters Patent is hereby corrected as shown below:

In the Specification

In column 13 at line 59, Change "Li[Ni$_{0.5}$Mn$_{1.5}$]O$_{4-\delta}$," to --LiNi$_{0.5}$Mn$_{1.5}$O$_4$--.

In column 13 at lines 59 and 60, for each occurrence, Change "$\alpha_0$" to --a$_0$--.

Signed and Sealed this  
Twenty-third Day of June, 2015

Michelle K. Lee  
*Director of the United States Patent and Trademark Office*